(12) United States Patent
Satoh

(10) Patent No.: US 10,931,875 B2
(45) Date of Patent: Feb. 23, 2021

(54) IMAGE PROCESSING DEVICE, IMAGE PROCESSING METHOD AND STORAGE MEDIUM

(71) Applicant: Morpho, Inc., Tokyo (JP)

(72) Inventor: Masaki Satoh, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 16/068,701

(22) PCT Filed: Jan. 13, 2017

(86) PCT No.: PCT/JP2017/001108
§ 371 (c)(1),
(2) Date: Jul. 9, 2018

(87) PCT Pub. No.: WO2017/122810
PCT Pub. Date: Jul. 20, 2017

(65) Prior Publication Data
US 2019/0028645 A1 Jan. 24, 2019

Related U.S. Application Data

(60) Provisional application No. 62/279,119, filed on Jan. 15, 2016.

(51) Int. Cl.
*H04N 5/232* (2006.01)
*G06T 7/11* (2017.01)

(52) U.S. Cl.
CPC ..... *H04N 5/23267* (2013.01); *H04N 5/23218* (2018.08); *H04N 5/23232* (2013.01);
(Continued)

(58) Field of Classification Search
CPC .......... H04N 5/23248; H04N 5/23264–23277; G06T 7/20–277; G06T 2207/20132; G06T 2207/20212–20221
See application file for complete search history.

(56) References Cited

U.S. PATENT DOCUMENTS

2006/0120615 A1* 6/2006 Wang ................. H04N 5/23248
382/254
2007/0098381 A1* 5/2007 Oshima ............... H04N 3/1575
396/52
(Continued)

FOREIGN PATENT DOCUMENTS

CN 101489147 A 7/2009
CN 102714696 A 10/2012
(Continued)

OTHER PUBLICATIONS

International Preliminary Report on Patentability and translation of Written Opinion dated Jul. 26, 2018 from the International Bureau in counterpart International Application No. PCT/JP2017/001108.
(Continued)

*Primary Examiner* — Paul M Berardesca
(74) *Attorney, Agent, or Firm* — Sughrue Mion, PLLC

(57) ABSTRACT

One aspect of the present disclosure is an image processing device performing image stabilization of frame images shot by an imaging device. This device is provided with an acquiring unit, an image generating unit and a cropping unit. The acquiring unit acquires the plurality of frame images. The image generating unit stitches, among the plurality of frame images acquired by the acquiring unit, a first frame image and a second frame image, the second frame image being one frame image among several frames before and after the first frame image, to generate a composite image larger than a size of the first frame image and the second frame image. The cropping unit sets a cropping region to the composite image and outputs an image in the cropping region as an output frame image.

15 Claims, 20 Drawing Sheets

(52) U.S. Cl.
CPC ..... *H04N 5/23254* (2013.01); *H04N 5/23274* (2013.01); *G06T 7/11* (2017.01); *G06T 2207/10016* (2013.01); *G06T 2207/20132* (2013.01); *H04N 5/23258* (2013.01); *H04N 5/23296* (2013.01)

(56) References Cited

U.S. PATENT DOCUMENTS

| | | | |
|---|---|---|---|
| 2013/0235221 A1 | 9/2013 | Zhou | |
| 2013/0287304 A1* | 10/2013 | Kimura | G06T 7/33 382/199 |
| 2016/0173782 A1* | 6/2016 | Dimson | H04N 5/23267 386/226 |

FOREIGN PATENT DOCUMENTS

| | | |
|---|---|---|
| CN | 103379291 A | 10/2013 |
| CN | 104994272 A | 10/2015 |
| JP | 2004248249 A | 9/2004 |
| JP | 2007164570 A | 6/2007 |
| JP | 2007221710 A | 8/2007 |
| JP | 2007226643 A | 9/2007 |
| JP | 2015179988 A | 10/2015 |
| KR | 10-2015-0110722 A | 10/2015 |

OTHER PUBLICATIONS

International Search Report in International Application No. PCT/JP2017/001108 dated Apr. 4, 2017.

* cited by examiner

Fig.5
(A)
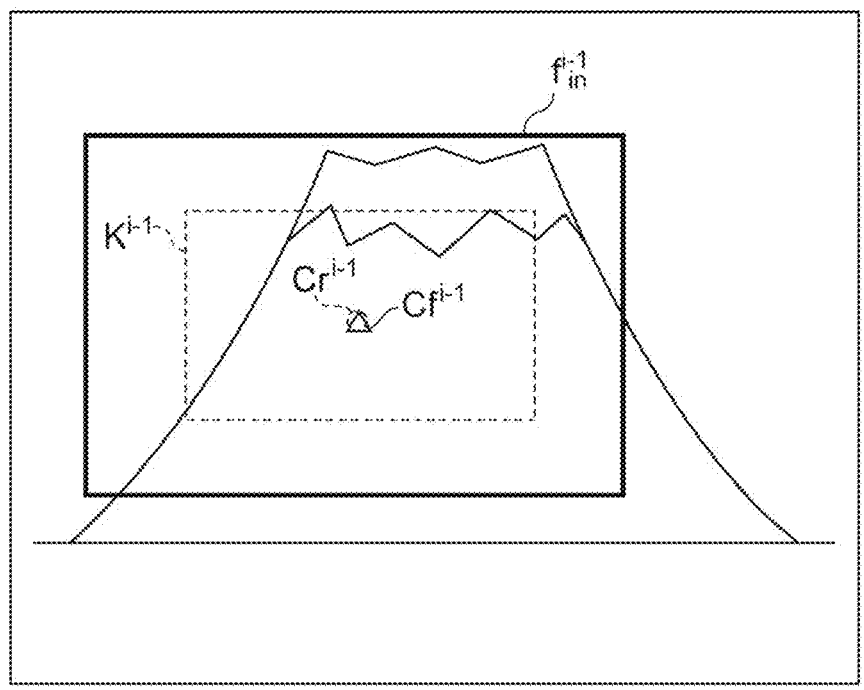
(B)
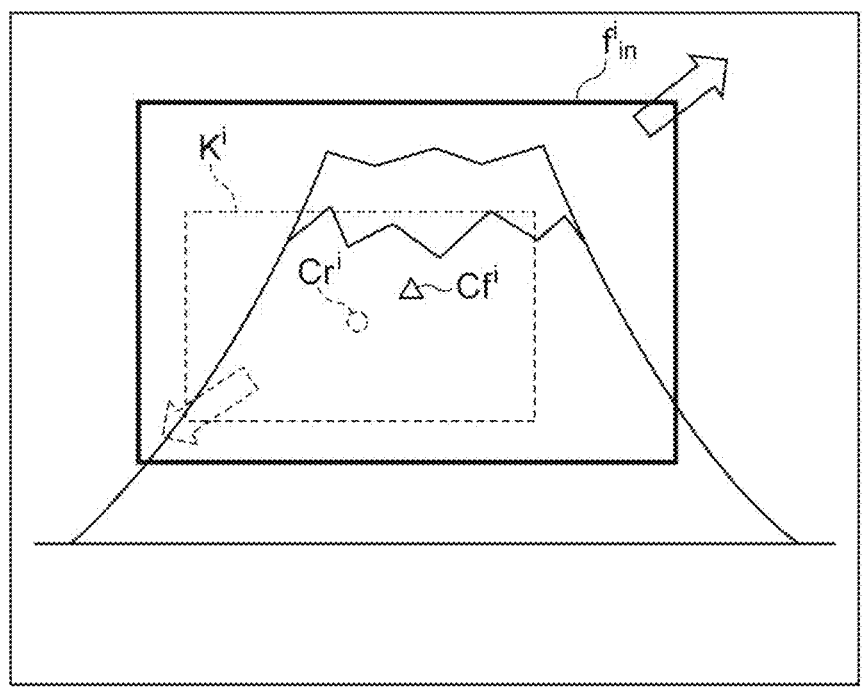

IMAGE PROCESSING DEVICE, IMAGE PROCESSING METHOD AND STORAGE MEDIUM

CROSS REFERENCE TO RELATED APPLICATIONS

This application is a National Stage of International Application No. PCT/JP2017/001108 filed Jan. 13, 2017, claiming benefit of provisional U.S. Patent Application No. 62/279,119 filed Jan. 15, 2016.

TECHNICAL Field

The present disclosure relates to an image processing device, an image processing method, an image processing program and a storage medium.

BACKGROUND ART

An image processing device is described in Patent Document 1. This device determines an appropriate cropping region to be cropping from a shot frame image in order to eliminate influence of handshakes and the like at the time of shooting video. This device performs a correction so that the cropping region is stationary relative to a motion of a camera by detecting motion data showing a degree of deviation between the frame image and a reference frame (for example, a frame image inputted last) and causing the cropping region to be moved or transformed according to the detected motion data. In the device described in Patent Document 1, however, when the cropping region includes a region other than a frame region where the frame image and the reference frame image overlap with each other, there is a possibility that a region in which pixel information is not included exists in an image after image stabilization.

In Patent Document 2, a device which, when an original cropping region includes the region other than the frame region described above, restricts the cropping region to be within the frame region described above. This device forces the cropping region to move into the frame region when the cropping region protrudes from the frame region.

CITATION LIST

Patent Document

Patent Document 1: Japanese Patent Laid-open No. 2007-226643

Patent Document 2: Specification of U.S. Patent Application Publication NO. 2013/0235221

SUMMARY OF INVENTION

Technical Problem

However, since the device described in Patent Document 2 works in a direction to restrict an image stabilization function, there is a possibility that the device cannot sufficiently exhibit the image stabilization function.

As another approach, it is conceivable to realize image stabilization by supplementing the image information about the region other than the frame region described above using other images. For example, the image information about the region other than the frame region described above is supplemented using a plurality of frame images before and after the frame image. Specifically, it is conceivable to collect and average image information about the region other than the frame region described above from motion information about the plurality of frame images, and estimate the image information about the region other than the frame region described above. However, since such an approach requires to process a plurality of frame images, an operation cost is very large, and the approach cannot be used as software to be embedded into a portable terminal and the like.

In this technical field, it is desired to exhibit the image stabilization function while suppressing the operation cost.

Solution to Problem

One aspect of the present disclosure is an image processing device performing image stabilization of frame images shot by an imaging device. This device includes an acquiring unit, an image generating unit and a cropping unit. The acquiring unit is configured to acquire the plurality of frame images. The image generating unit is configured to generate a composite image by stitching a first frame image and a second frame image among the plurality of frame images acquired by the acquiring unit. The second frame image is one frame image among several frames before and after the first frame image. The composite image is larger than a size of the first frame image and the second frame image. The cropping unit is configured to set a cropping region to the composite image and configured to output an image in the cropping region as an output frame image.

In this device, a composite image is generated by stitching the first frame image and the second frame image. Therefore, the image processing device can suppress an operation cost for generating a composite image in comparison with the case of supplementing image information about a region other than a frame region using a plurality of frame images. Then, the cropping region is set to the composite image larger than the first frame image and the second frame image. Thereby, the necessity of restricting a region where the cropping region can be set to be within the first frame region is eliminated, and, therefore, the opportunity of being able to sufficiently exhibit the image stabilization function increases. Thus, according to one aspect of the present disclosure, it is possible to exhibit the image stabilization function while suppressing the operation cost.

In one embodiment, the cropping unit can set the cropping region to the first frame image. At this time, the image generating unit may generate the composite image when it is not possible to set the cropping region in the first frame image by the cropping unit. Further, the image generating unit may not generate the composite image when it is possible to set the cropping region in the first frame image by the cropping unit. Since this image generation device does not generate the composite image when it is not necessary to expand the region where the cropping region can be set, the device can further reduce the operation cost.

In one embodiment, the image generating unit may select the second frame image to be stitched with the first frame image, from a frame group consisting of the several frames before and after the first frame image. In this case, the image generation device can select the second frame image from among a plurality of candidates.

In one embodiment, the acquiring unit may acquire the frame images from video or hyerlapse video. In one embodiment, the acquiring unit may acquire the frame images from the imaging device.

In one embodiment, the cropping unit may set a position of the cropping region according to a motion of the imaging device. Thereby, the image processing device can cancel a motion of the imaging device.

In one embodiment, the image generating unit may limit a search range of a position of a seam between the first frame image and the second frame image. Thereby, the image processing device can suppress the operation cost.

In one embodiment, the image processing device may further include a magnification acquiring unit configured to acquire at least one of a zoom-in magnification, a zoom-out magnification and an object display magnification of the first frame image relative to the second frame image. In this case, the image generating unit does not generate the composite image when an amount of change per unit time of the magnification acquired by the magnification acquiring unit is equal to or above a threshold. Thus, by not generating a composite image when it is expected that the operation cost of the composite image is large, the image processing device can avoid response deterioration.

In one embodiment, the image processing device may further include a recognizing unit configured to recognize a size of an object of the first frame image or the second frame image. In this case, the image generating unit does not generate the composite image when the size of the object recognized by the recognizing unit is equal to or above a threshold. Thus, by not generating a composite image when it is expected that the composite image becomes an unnatural image, the image processing device can avoid image quality deterioration.

Another aspect of the present disclosure is an image processing method for performing image stabilization of frame images shot by an imaging device. The method includes an acquiring step, an image generating step and a cropping step. At the acquiring step, the plurality of frame images is acquired. At the image generating step, a composite image is generated by stitching a first frame image and a second frame image among the plurality of frame images acquired by the acquiring step. The second frame image is one frame image among several frames before and after the first frame image. The composite image is larger than a size of the first frame image and the second frame image. At the cropping step, a cropping region is set to the composite image, and an image in the cropping region is outputted as an output frame image.

Another aspect of the present disclosure is an image processing program for performing image stabilization of frame images shot by an imaging device. The program causes a computer to function as an acquiring unit, an image generating unit and a cropping unit. The acquiring unit is configured to acquire the plurality of frame images. The image generating unit is configured to generate a composite image by stitching a first frame image and a second frame image among the plurality of frame images acquired by the acquiring unit. The second frame image is one frame image among several frames before and after the first frame image. The composite image is larger than a size of the first frame image and the second frame image. The cropping unit is configured to set a cropping region to the composite image and configured to output an image in the cropping region as an output frame image.

Another aspect of the present disclosure is a storage medium storing an image processing program for performing image stabilization of frame images shot by an imaging device. The program causes a computer to function as an acquiring unit, an image generating unit and a cropping unit. The acquiring unit is configured to acquire the plurality of frame images. The image generating unit is configured to generate a composite image by stitching a first frame image and a second frame image among the plurality of frame images acquired by the acquiring unit. The second frame image is one frame image among several frames before and after the first frame image. The composite image is larger than a size of the first frame image and the second frame image. The cropping unit is configured to set a cropping region to the composite image and outputs an image in the cropping region as an output frame image.

According to the image processing method, the image processing program and the storage medium, the same effects as the image processing device according to the one aspect are obtained.

Another aspect of the present disclosure is an image processing device performing image stabilization of frame images shot by an imaging device. This device includes an acquiring unit, an image generating unit and a cropping unit. The acquiring unit is configured to acquire the plurality of frame images. The cropping unit is configured to set cropping regions to the plurality of frame images acquired by the acquiring unit and outputs images in the cropping regions as output frame images. The acquiring unit is configured to acquire the frame images from video or hyperlapse video. In a case where performing search using a tree structure with the frame images being hierarchized, the cropping unit performs camera work search, restricting a search range of the tree structure, and sets the cropping regions in the frame images in a manner that components other than searched-out camera works among motion data are cancelled.

In this device, at the time of performing search using a tree structure, calculation in which the number of child nodes belonging to each parent node, the number of nodes existing at the same depth and the like are restricted is performed. Thereby, this device can reduce the operation cost.

Advantageous Effects of Invention

According to various aspects of the present disclosure, it is possible to exhibit the image stabilization function while suppressing the operation cost.

BRIEF DESCRIPTION OF DRAWINGS

FIG. 5 is a diagram illustrating a relationship between a position of the cropping region and a movement direction of an imaging device.

DESCRIPTION OF EMBODIMENTS

Figure 1:
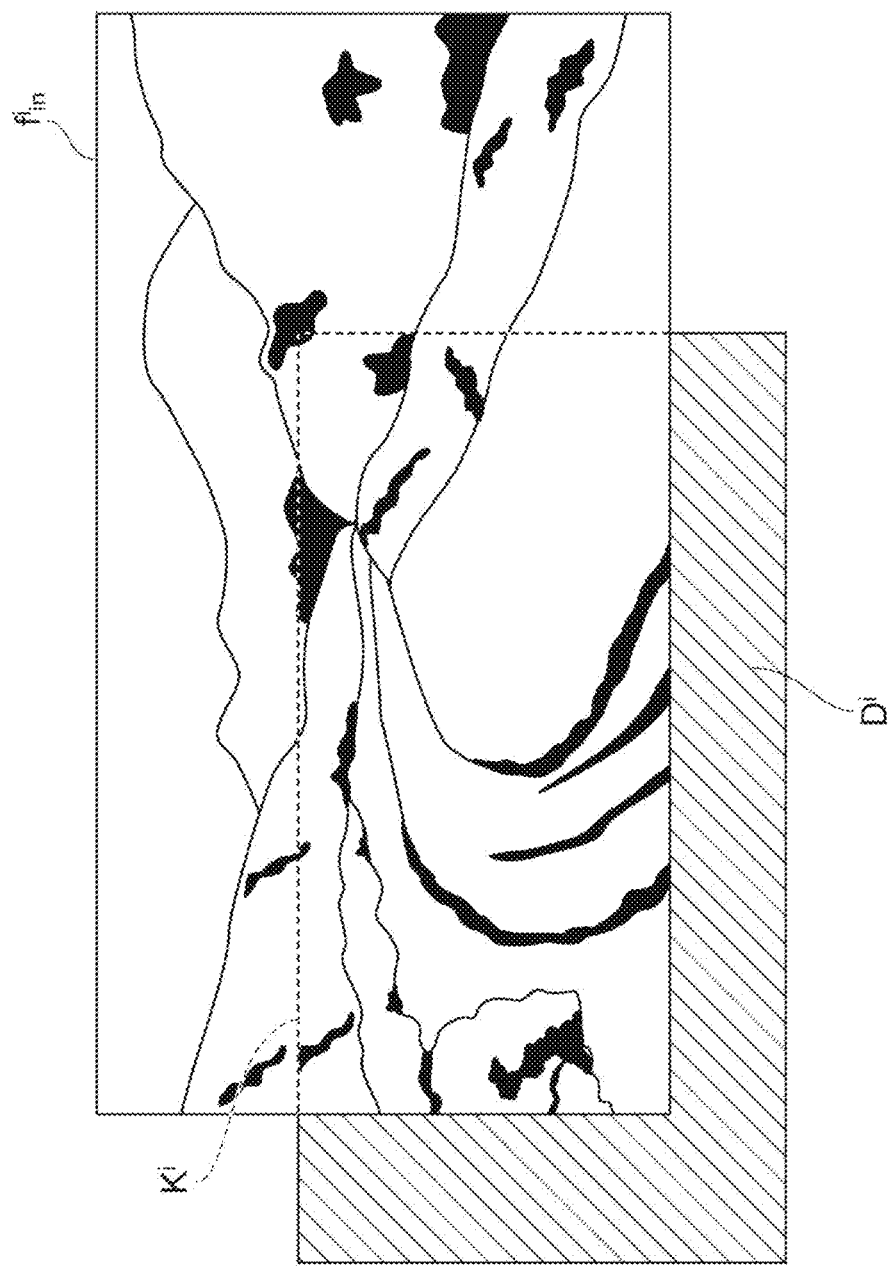
FIG. 1 is an example in which a cropping region protrudes from an input frame image.

An embodiment of the present disclosure will be described below with reference to drawings. In the description below; the same reference numeral is given to the same parts or components. Names and functions of the parts or components are the same. Therefore, detailed description of the parts or components will not be repeated.

Technical Ideas

An electronic stabilizer that stabilizes video or an image shot by an imaging device is known. In the electronic stabilizer, a stabilized output frame image is obtained by cropping an input frame image to cancel handshakes. When a cropping region is not included in the input frame image, however, the output frame image includes a region where pixel information is not defined (a deficit region). FIG. 1 is an example in which a cropping region protrudes from an input frame image $f^i_{in}$. As shown in FIG. 1, the cropping region $K^i$ is set on the input frame image $f^i_{in}$. An image in the cropping region $K^i$ becomes an output frame image. When the cropping region $K^i$ protrudes from the input frame image $f^i_{in}$, the output frame image includes a deficit region $D^i$ for which pixel information is not defined. Here, "i" is a number showing an input order position or the like and is an integer.

In FIG. 1, when the size of the cropping region $K^i$ is small, the possibility that the cropping region $K^i$ includes the deficit region $D^i$ is reduced. Therefore, favorable video stabilization is brought about. However, as the size of the cropping region $K^i$ is smaller, an effective angle of view of the output frame image becomes narrower. Therefore, it is difficult to cause image quality and video stabilization to be compatible with each other by an approach of simply decreasing the size of the cropping region $K^i$.

Figure 2:
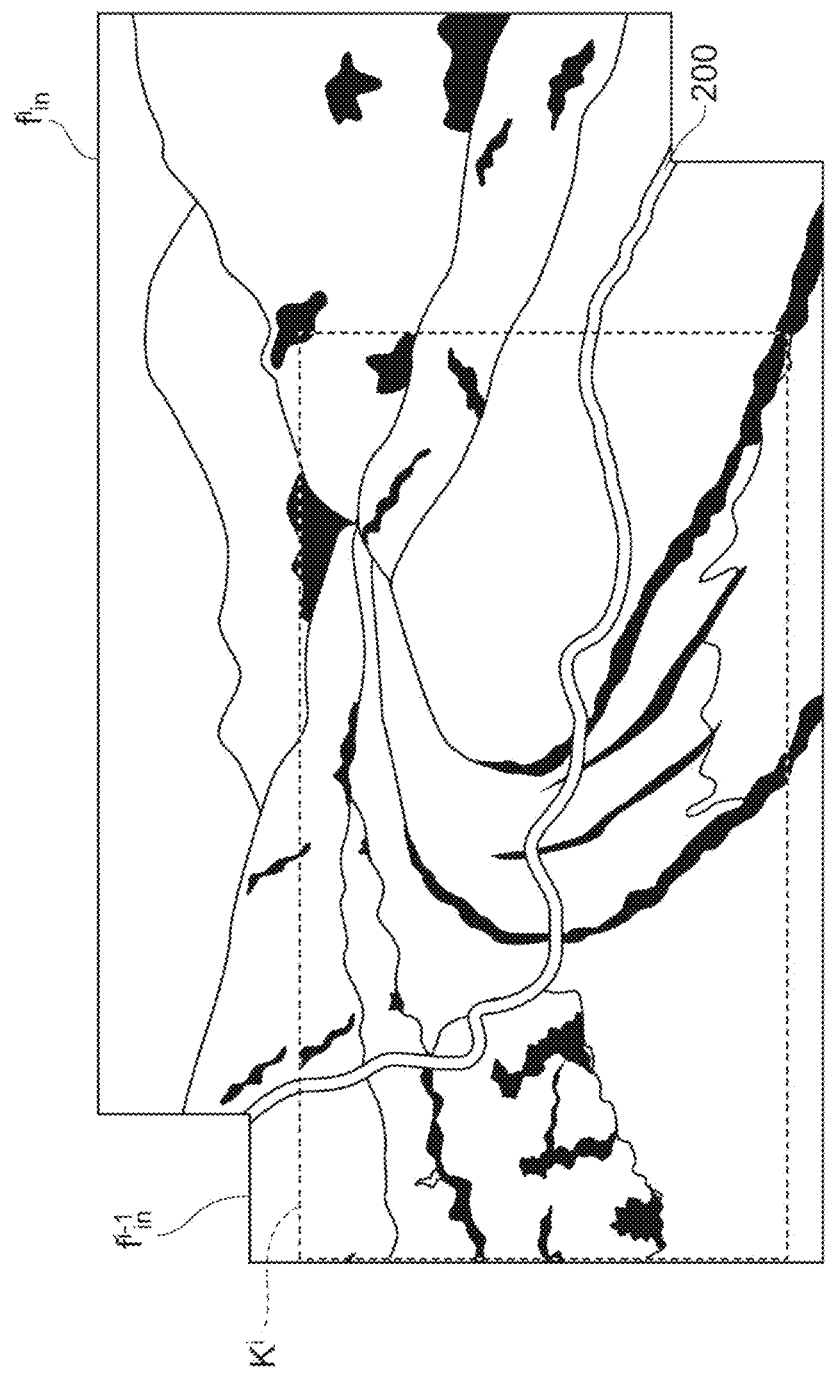
FIG. 2 is an example in which, by stitching two input frame images, a deficit region of the cropping region is supplemented.

As a method fir supplementing the pixel information about the deficit region $D^i$, a method of supplementing the image information about the deficit region $D^i$ by performing complicated calculation using a lot of frame images is conceivable. However, there is a problem that calculation cost is too high as a system to be embedded into a portable terminal such as a smartphone. In the present disclosure, a new approach of an electronic stabilizer is proposed in the approach of the present disclosure, for example, two adjacent frame images are stitched. FIG. 2 is an example in which, by stitching two input frame images, the deficit region $D^i$ of the cropping region $K^i$ is supplemented. As shown in FIG. 2, by stitching the input frame image $f^i_{in}$, and an input frame image $f^{i-1}_{in}$ inputted immediately previously along a seam 200, a composite image (a polygon) larger than the input frame image $f^i_{in}$ and the input frame image $f^{i-1}_{in}$ is generated. By the two frame images being stitched along an optimal seam 200, the angle of view effectively expands, and unnaturalness of the composite image is mitigated in realistic processing time. Then, it is possible to, by cropping an output frame image from this composite image, realize compatibility between image quality and video stabilization at a low operation cost.

First Embodiment

An image processing device according to the present embodiment is a device that performs image stabilization of frame images shot by an imaging device. The image processing device is used, for example, for consecutive shooting of a plurality of images and video shooting. The image processing device can be mounted on a mobile terminal with restricted resources, for example, a portable telephone, a smartphone, a digital camera, a PDA (Personal Digital Assistant) or the like. However, it is not indispensable for the image processing device to be mounted on these pieces of equipment, and may be mounted, for example, on an ordinary computer system.

Device Configuration

Figure 3:
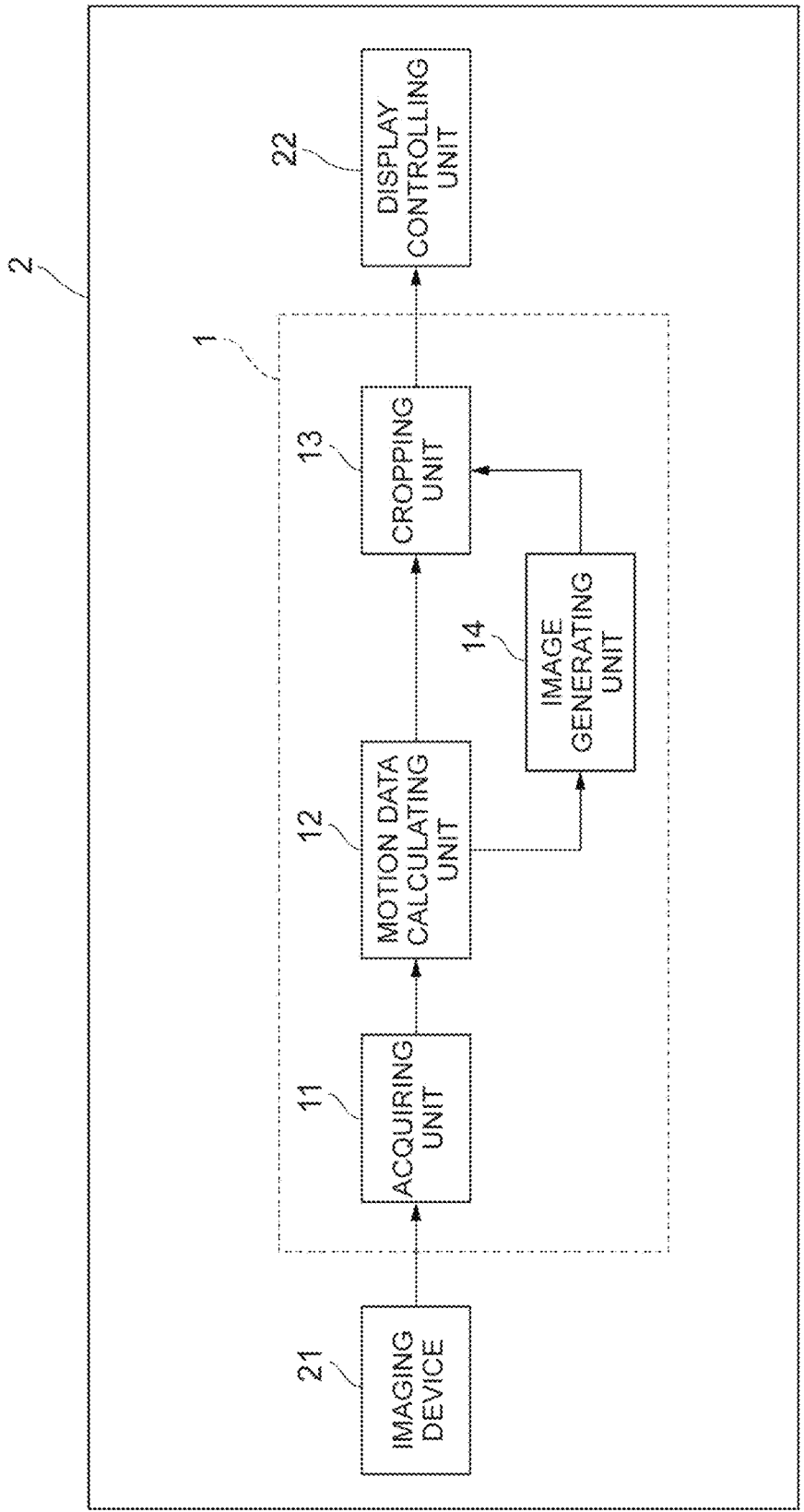
FIG. 3 is a functional block diagram of a portable terminal provided with an image processing device according to a first embodiment.
Figure 4:
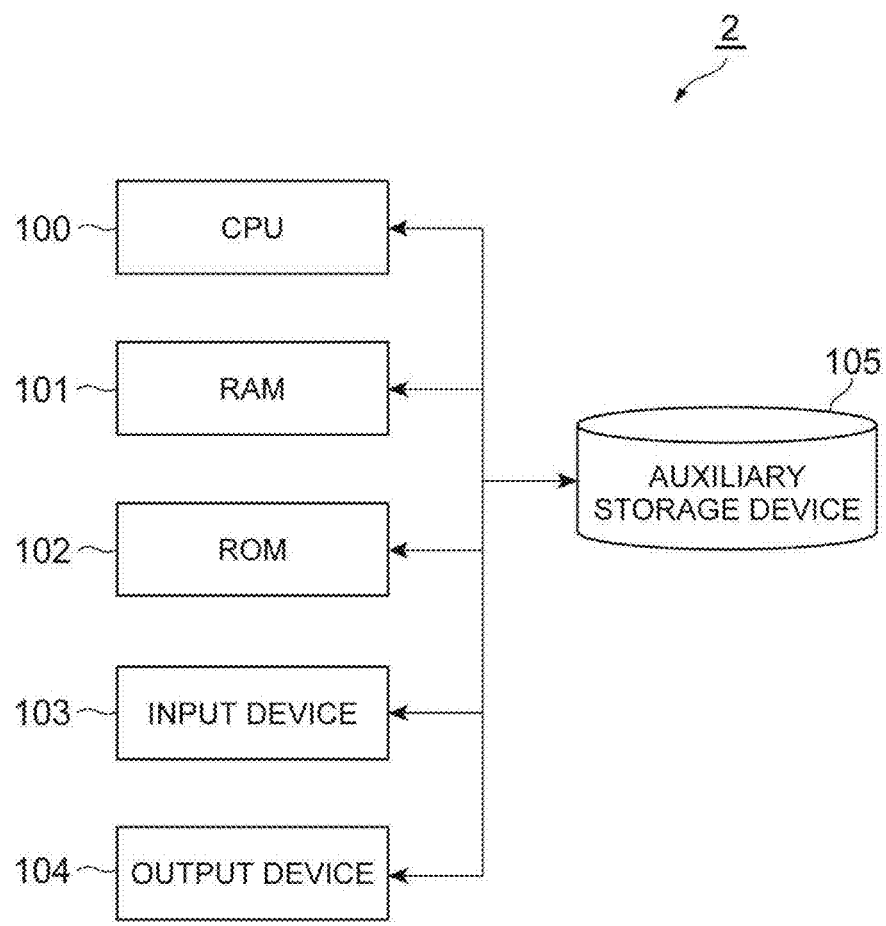
FIG. 4 is a hardware configuration diagram of the portable terminal.

FIG. 3 is a functional block diagram of a portable terminal 2 provided with an image processing device 1 according to the present embodiment. The portable terminal 2 shown in FIG. 3 is, for example, a mobile terminal carried by a user and has a hardware configuration shown in FIG. 4. FIG. 4 is a hardware configuration diagram of the portable terminal 2. As shown in FIG. 4, the portable terminal 2 is physically configured as an ordinary computer system that includes a CPU (Central Processing Unit) 100, a main memory such as a ROM (Read Only Memory) 101 and a RAM (Random Access Memory) 102, an input device 103 such as a camera or a keyboard, an output device 104 such as a display, an auxiliary storage device 105 such as a hard disk, and the like. Each of functions of the portable terminal 2 and the image processing device 1 to be described later is realized by causing predetermined computer software to be read onto hardware such as the CPU 100, the ROM 101 and the RAM 102. Specifically, each of the functions of the portable terminal 2 and the image processing device 1 to be described later is realized by causing the input device 103 and the output device 104 to operate under the control of the CPU 100 and performing reading and writing of data in the main memory or the auxiliary storage device 105. Though the above description has been made as description of the hardware configuration of the portable terminal 2, the image processing device 1 may be configured as an ordinary computer system that includes the CPU 100, the main memory such as the ROM 101 and the RAM 102, the input device 103, the output device 104, the auxiliary storage device 105 and the like. Further, the portable terminal 2 may be provided with a communication module.

As shown in FIG. 3, the portable terminal 2 is provided with an imaging device 21, the image processing device 1 and a display controlling unit 22. The imaging device 21 is a device that shoots frame images consecutive in time series. Examples of the imaging device 21 include a camera that shoots video. The video includes frame images consecutive in time series. The imaging device 21 may have a consecutive imaging function of repeatedly shooting images at predetermined intervals from a timing specified by a user operation or the like. As an example, the imaging device 21 stores the frame image into a storage unit that the image processing device 1 can refer to.

The image processing device 1 generates an output frame image by inputting and processing frame images obtained by the imaging device 21. A frame image includes pixel values. A pixel value is information associated with a pixel, and, for example, a brightness value, a color difference value, saturation and the like are included. The image processing device 1 is provided, for example, with an acquiring unit 11, a motion data calculating unit 12, a cropping unit 13 and an image generating unit 14.

The acquiring unit 11 acquires a plurality of frame images. The acquiring unit 11 is realized by the CPU 100 executing a program in the main memory or the auxiliary storage device 105 and controlling the input device 103 according to the program. As an example, the acquiring unit 11 acquires the plurality of frame images from the imaging device 21 as a plurality of input frame images.

The motion data calculating unit 12 calculates a motion between frame images. The motion data calculating unit 12 is realized by the CPU 100 executing the program in the main memory or the auxiliary storage device 105. The motion data calculating unit 12 associates coordinates between input frame images acquired by the acquiring unit 11. The motion data calculating unit 12 may calculate a difference between the input flame images to associate the coordinates between the frame images or may calculate positional change of an origin between the frame images to associate the coordinates between the frame images. Otherwise, the image processing device 1 may be provided with a gyro sensor so that the motion data calculating unit 12 may acquire a motion between a target frame image and a previous or following frame image using a detection result by the gyro sensor. When the detection result by the gyro sensor is used, robustness is excellent in comparison with the case of using data only of the frame images.

In the case of using a difference between frame images, the motion data calculating unit 12 adopts, for example, a pyramid image approach. In this case, the motion data calculating unit 12 performs block matching for minimizing the sum of absolute values of inter-frame image differences first, and individually tracks sparsely selected Harris-Stephens feature points. At this time, the motion data calculating unit 12 determines an initial vector for each block matching using frame images converted to a lower layer. Then, the motion data calculating unit 12 calculates perspective transformation between two adjacent frame images using a least squares method. By the perspective transformation, coordinates between the two frame images are associated.

The cropping unit 13 sets a cropping region to a first frame image or a composite image to be described later and outputs an image in the cropping region as an output frame image. The cropping unit 13 is realized by the CPU 100 executing the program in the main memory or the auxiliary storage device 105.

The cropping unit 13 can set a position of the cropping region $K^i$ according to a motion of the imaging device 21. The cropping unit 13 sets the position of the cropping region $K^i$, for example, according to a motion between input frame images calculated by the motion data calculating unit 12. Then, the cropping unit 13 outputs an image in the cropping region as an output frame image. FIG. 5 is a diagram illustrating a relationship between the position of the cropping region $K^i$ and a movement direction of the imaging device 21. In states (A) and (B) in FIG. 5, input frame images consecutively shot by the imaging device 21 are indicated by and $f^{i-1}_{in}$ and $f^i_{in}$, center positions of the input frame images are indicated by $Cf^{i-1}$ and $Cf^i$. The cropping unit 13 sets a cropping region $K^{i-1}$ with a size smaller than the size of the input frame image $f^{i-1}_{in}$ here. For example, the size of the cropping region $K^{i-1}$ is 70 to 90% of the size of the input frame image $f^{i-1}_{in}$. This cropping region $K^{i-1}$ becomes an output frame image. It is assumed that the imaging device 21 shifts from an imaging position shown by the state (A) to an imaging position shown by the state (B) next (a shift in an upper right direction indicated by a solid line arrow in the state (B) in FIG. 5). In this case, the input frame image $f^i_{in}$ shifted right above the input frame image $f^{i-1}_{in}$ is obtained. Here, the cropping unit 13 sets the cropping region $K^i$ at a position of offsetting a motion between the input frame image $f^{i-1}_{in}$ and the input frame image $f^i_{in}$ (a shift in a lower left direction indicated by a broken-line arrow in the state (B) in FIG. 5). Since the center positions $Cr^{i-1}$ and $Cr^i$ of the cropping region $K^{i-1}$ become similar positions thereby, an output frame image appearing as if it were stationary is generated.

Figure 6:
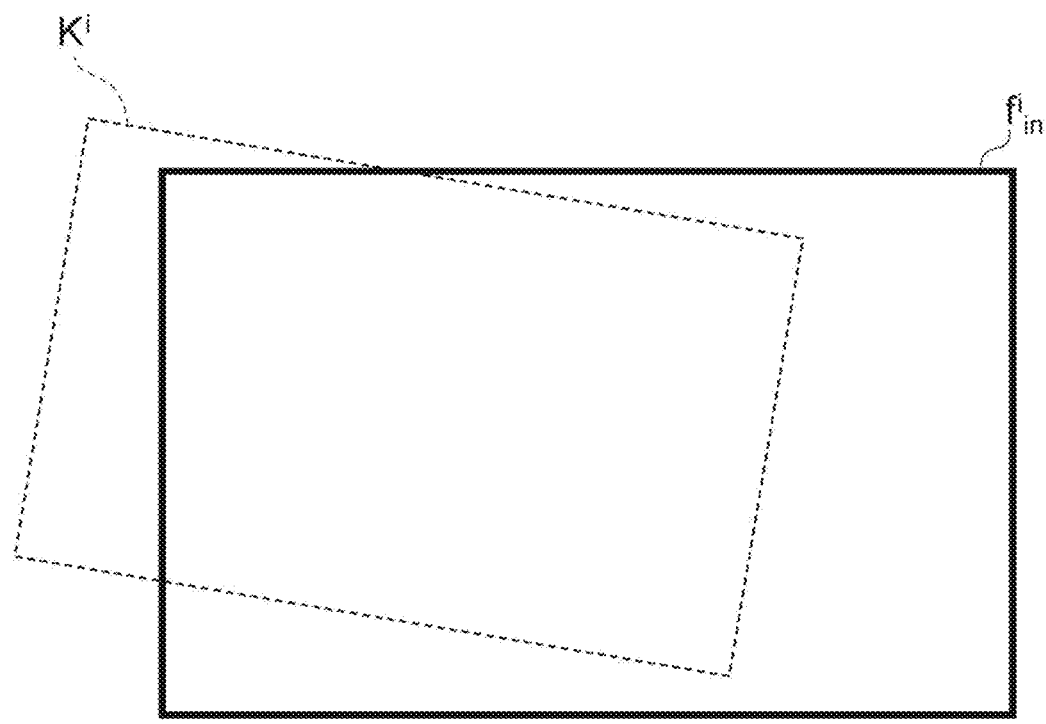
FIG. 6 is a diagram illustrating protrusion of the cropping region.

When the motion between the input frame images calculated by the motion data calculating unit 12 is large, the cropping region $K^i$ may protrude from the input frame image $f^i_{in}$. FIG. 6 is a diagram illustrating the protrusion of the cropping region $K^i$. As shown in FIG. 6, when the motion between the input frame images calculated by the motion data calculating unit 12 is large, the cropping region $K^i$ set at the position of offsetting the motion between the input frame images includes a region outside an edge of the input frame image $f^i_{in}$. Pixel information is not defined for the region outside the edge of the input frame image $f^i_{in}$. Therefore, when the image in the cropping region $K^i$ is set as an output frame image in that state, an output result not accepted by a user is obtained. Therefore, any of measures of resetting the cropping region $K^i$ in the input frame image $f^i_{in}$, sacrificing image stabilization to some extent and supplementing pixel information about the region outside the edge of the input frame image $f^i_{in}$ using another input frame image becomes necessary.

Figure 7:
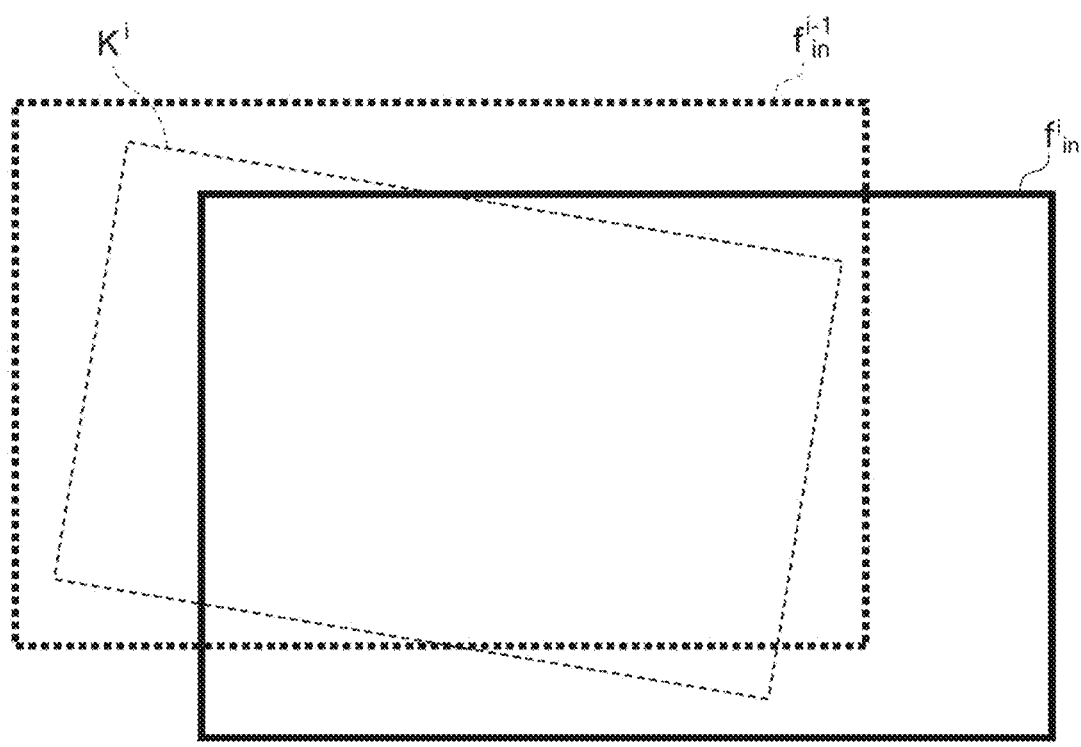
FIG. 7 is a diagram illustrating supplementation of the cropping region using two input frame images.

It is assumed that several frames before and after an input frame image to be a processing target (hereinafter also referred to as first frame image) are of imaging results that are the same as or close to an imaging result of the first frame image. Therefore, there is a possibility of being able to supplement the pixel information about the region outside the edge of the input frame image $f^i_{in}$ using the several frames before and after the first frame image. FIG. 7 is a diagram illustrating supplementation of the cropping region $K^i$ using two input frame images. As shown in FIG. 7, as an example, it is possible to acquire pixel information about the whole cropping region $K^i$ by using the input frame image $f^i_{in}$ to be a processing target and the immediately previous input frame image $f^{i-1}_{in}$. Therefore, even if the cropping region $K^i$ protrudes from the input frame image $f^i_{in}$ to be a processing target, it is possible to sufficiently exhibit the image stabilization function when the cropping region $K^i$ is within a composite image generated by the input frame image $f^i_{in}$, and the immediately previous input frame image $f^{i-1}_{in}$. Further, even if the cropping region $K^i$ is outside the composite image, it is possible to reduce unsteadiness of a screen due to image stabilization because it is possible to reduce an amount of being pushed back into a region where pixel information exists, in comparison with the case of using only the input frame image $f^i_{in}$. Instead of the immediately previous input frame image $f^{i-1}_{in}$, an immediately following input frame image $f^{i+1}_{in}$ may be used.

The image generating unit 14 stitches a first frame image and a second frame image included in a plurality of frame images acquired by the acquiring unit 11 to generate a composite image. The image generating unit 14 is realized by the CPU 100 executing the program in the main memory or the auxiliary storage device 105. The image generating unit 14 grasps a positional relationship between frame images using a motion calculated by the motion data calculating unit 12 and stitches the first frame image and the second frame image. A composite image includes a part or the whole of the first frame image and a part or the whole of the second frame image. The size of the composite image is larger than the size of the first frame image and the second frame image.

The second frame is a frame image that is any one of several frames before and after the first frame image. The several frames are, for example, one to five frames. The image generating unit 14 may select the second frame image to be stitched with the first frame image from a frame group consisting of the several frames before and after the first frame image. As a specific example, the image generating unit 14 may select a frame image that overlaps with a cropping region most from the frame group and set it as the second frame. Otherwise, the image generating unit 14 may select a frame image that overlaps with the cropping region by a predetermined region or more from the frame group and set it as the second frame. For example, when a frame image immediately after the first frame image overlaps with the cropping region more than an immediately previous frame image, the image generating unit 14 selects the immediately following frame image as the second frame image.

Figure 8:
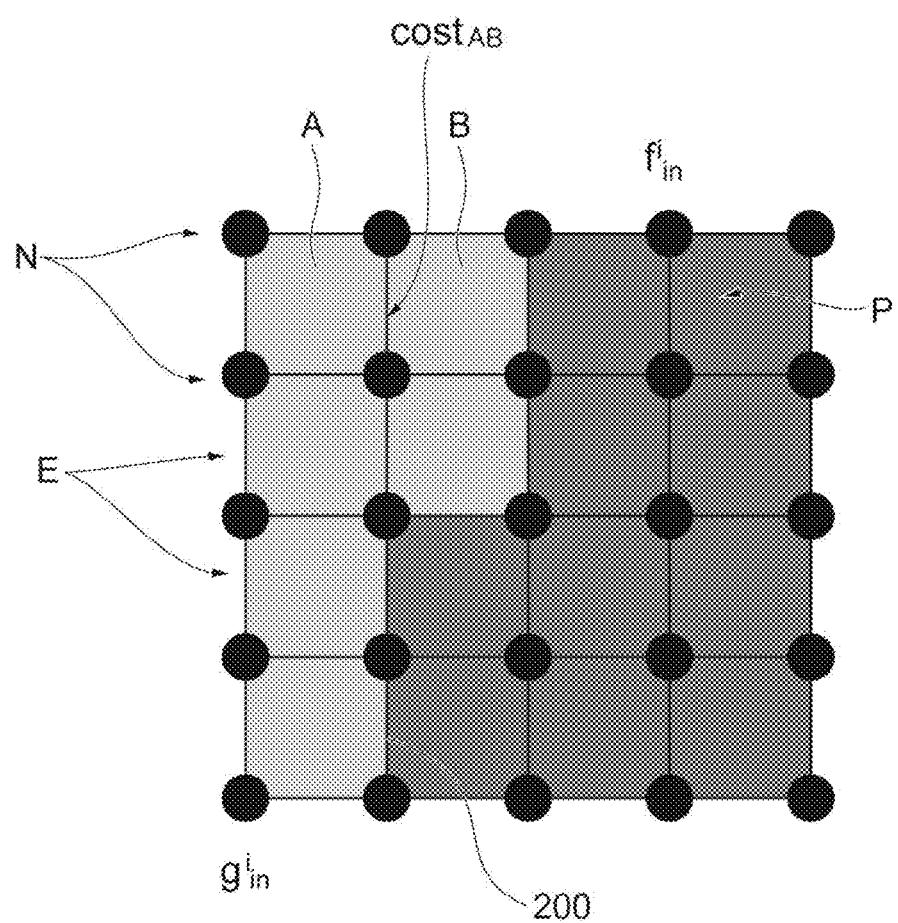
FIG. 8 is a diagram illustrating a seam between two input frame images.

The image generating unit 14 generates a composite image by determining a seam 200 between two input frame images and combining the two input frame image along the seam 200. FIG. 8 is a diagram illustrating the seam 200 between two input frame images. As shown in FIG. 8, in order to determine the seam 200 between the first frame image $f^i_{in}$ to be a processing target and a second frame image $g^i_{in}$, an intersection point among four adjacent pixels P is assumed to be a node N, and a boundary between two pixels P is assumed to be an edge E. Using pixel values of adjacent pixels with a certain edge therebetween, the image generating unit 14 defines a cost of the edge. For example, the size of a difference between the pixel values of the adjacent pixels (e.g., difference of brightness values) is defined as the cost. Further, the seam 200 is determined so that a sum total of costs of edges on a route becomes the minimum. The image generating unit 14 assigns a cost only to the edge E. For example, the cost is defined using the following expression (1):

[Expression 1]

$$\cos t_{AB} = |L_A^{main} - L_B^{sub}| + |L_A^{sub} - L_B^{main}| \qquad (1)$$

Here, $L_A$ and $L_B$ indicate brightness values of arbitrary adjacent pixels (pixels A and B), and $cost_{AB}$ indicates a cost of an edge E therebetween. Further, $L^{main}$ indicates a brightness value of pixels of the first frame image $f^i_{in}$, and $L^{sub}$ indicates a brightness value of pixels of the second frame image $g^i_{in}$. The image generating unit 14 determines such a route of the edge E that the cost is minimized using a Dijkstra's algorithm (COWEN, T. H., LEISERSON, C. E., WEST, R. L., AND STEIN, C. 2009. Introduction to algorithms. MIT Press). Thereby, the image generating unit 14 can determine the most inconspicuous seam 200. The image generating unit 14 may set a cost near the deficit region $D^i$ to infinity so that the seam 200 does not cross the deficit region $D^i$. Further, the image generating unit 14 may set a cost of a boundary part of an output frame image to zero.

Figure 9:
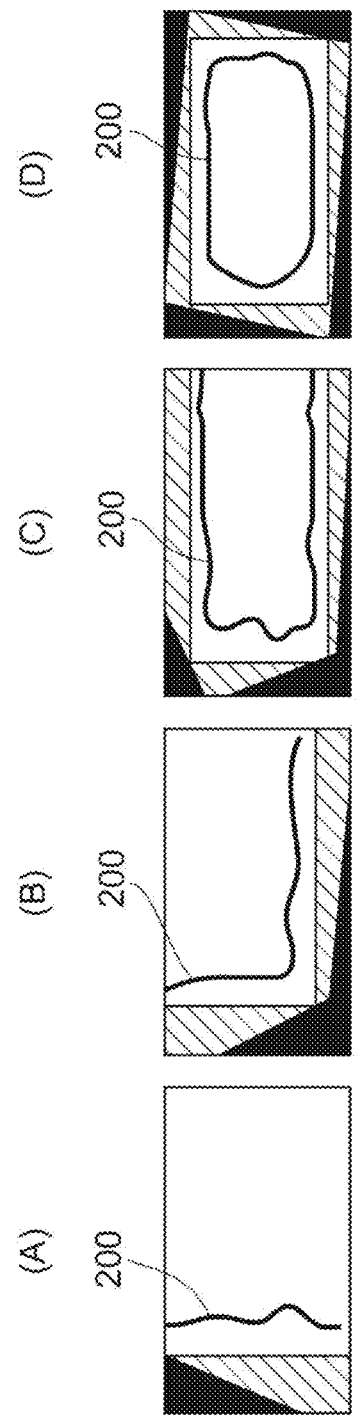
FIG. 9 is a diagram illustrating kinds of deficit regions.

The image generating unit 14 may limit a search range of a position of a seam between a first frame image and a second frame image in order to reduce the operation cost. FIG. 9 is a diagram illustrating kinds of deficit regions. Classifications (A) to (D) in FIG. 9 are classifications of deficit regions of a first frame image. Each square outer frame indicates the first frame image; each region painted in black indicates the deficit region $D^i$, and each hatched region expresses a deficit region type. As shown by the classifications (A) to (D) in FIG. 9, the deficit regions $D^i$ can be classified into four types. The classification (A) is a deficit region configured with a rectangle sticking to one side; the classification (B) is a deficit region configured with two rectangles sticking to two adjacent sides; the classification (C) is a deficit region configured with three rectangles sticking to three sides; and the classification (D) is a deficit region configured with four rectangles sticking to all sides. A general deficit region is not configured with a rectangle. Therefore, at the time of performing classification, a deficit region is classified by approximating the deficit region to a combination of one to four rectangles in a manner that a region difference is small. The region approximated to the rectangle or rectangles corresponds to each hatched region shown in FIG. 9.

Figure 10:
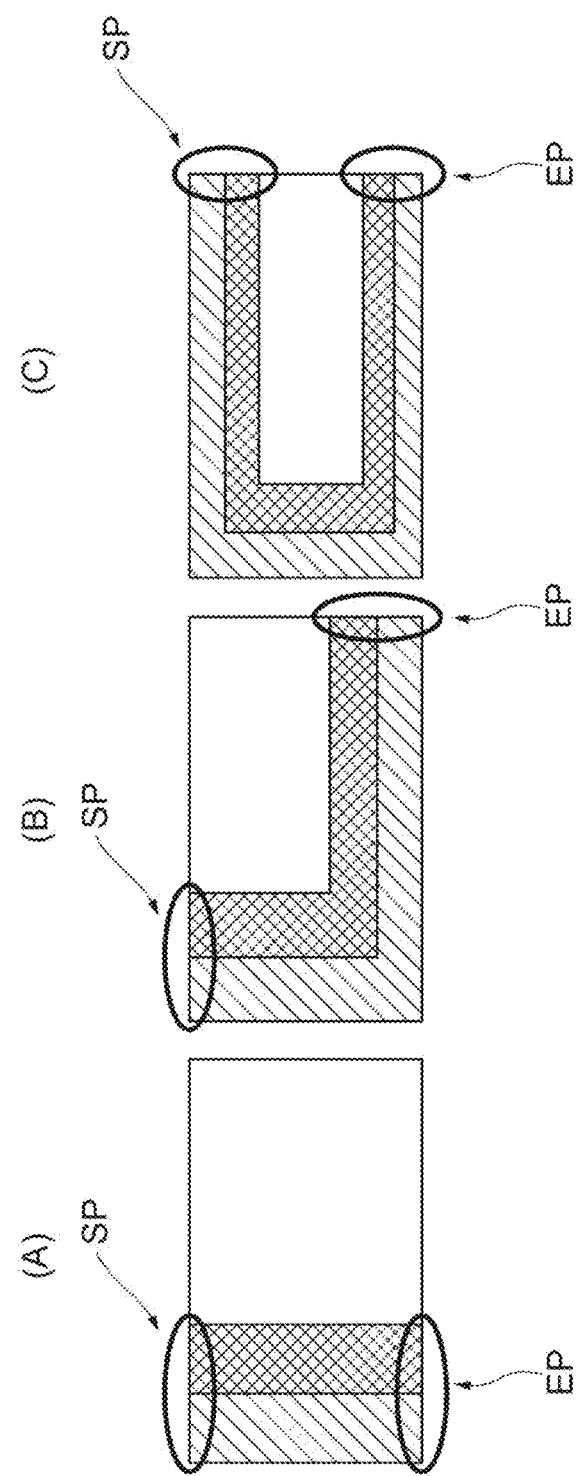
FIG. 10 is a diagram illustrating a search range, a search start position and a search end position of the seam.

The image generating unit 14 sets a search range, a search start position and a search end position for each of the deficit region classifications. FIG. 10 is a diagram illustrating a search range, a search start position and a search end position of the seam 200. Each square outer frame indicates a first frame image. The search range is each range indicated by two kinds of hatched regions and is set, for example, by extending each rectangularly approximated region shown in FIG. 9. For example, the search range is set to a size with a width corresponding to two to four times the width of the rectangular approximation region.

The image generating unit 14 sets a search range, a search start position SP and a search end position EP for each of the classifications (A) to (C). By the search range being limited in this way, the operation cost is reduced. As for the classification (D) in FIG. 9, the classification cannot be handled with the Dijkstra's algorithm. Therefore, a composite image is not generated for the classification (D) in FIG. 9.

The cropping unit 13 sets the cropping region $K^i$ on a canvas (a coordinate space) where a first frame image and a composite image are depicted. The image generating unit 14 generates a composite image when it is not possible to set the cropping region $K^i$ in the first frame image by the cropping unit 13, and does not generate a composite image when it is possible to set the cropping region $K^i$ in the first frame image by the cropping unit 13. When it is not possible to set the cropping region $K^i$ in a composite image, the cropping unit 13 forces the cropping region $K^i$ to move into the composite image. When it is not possible to set the cropping region $K^i$ in the first frame image, and it is not possible to generate a composite image by the image generating unit 14 (in the case of the classification (D) in FIG. 9), the cropping unit 13 forces the cropping region $K^i$ to move into the first frame image.

The cropping unit 13 outputs an output frame image to the display controlling unit 22. The display controlling unit 22 is connected to a display device capable of displaying an image or video and causes the output frame image to be displayed on the display device.

Output Frame Image Generation Process

Figure 11:
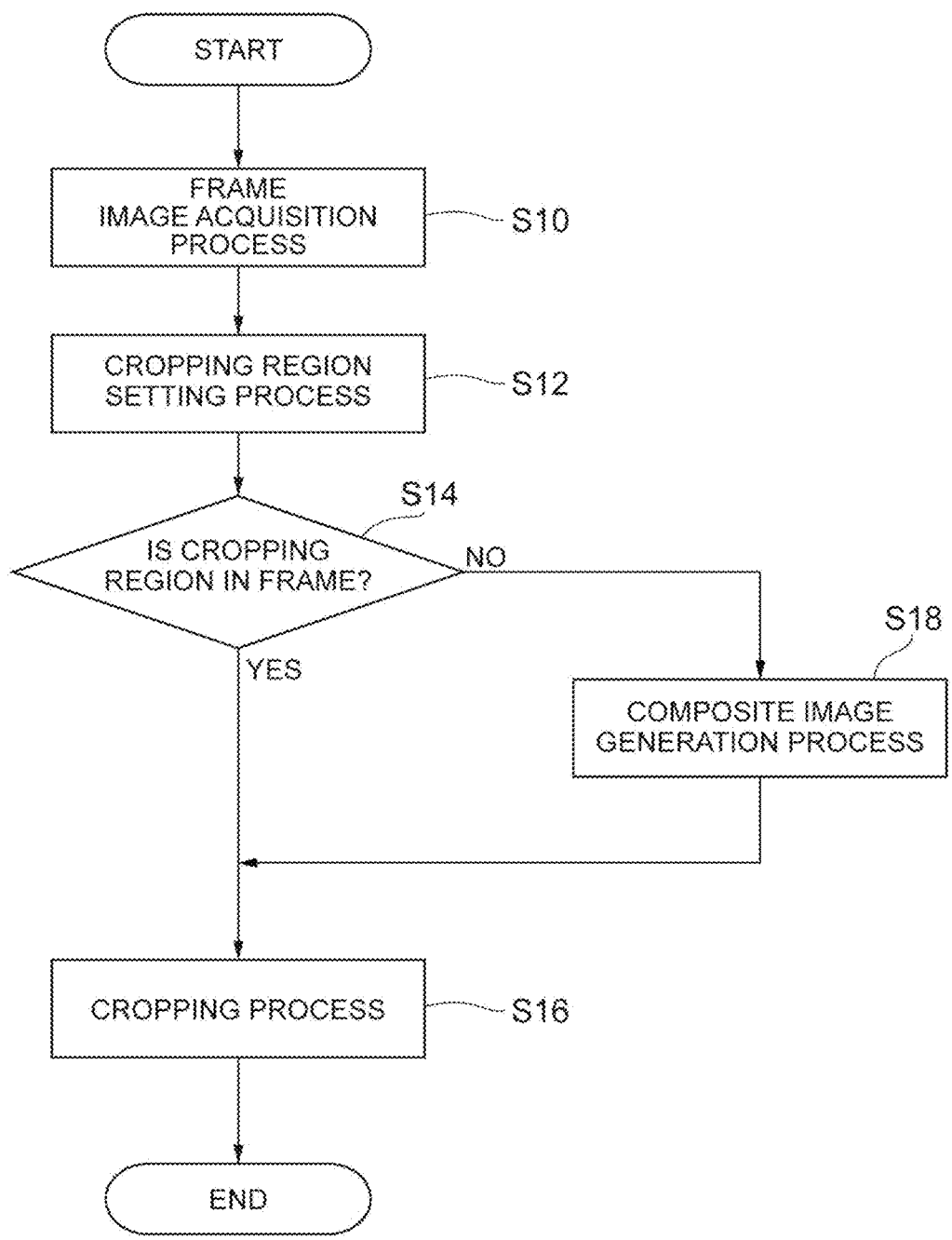
FIG. 11 is a flowchart of an output frame image generation process of the image processing device according to the first embodiment.

FIG. 11 is a flowchart of an output frame image generation process of the image processing device 1 according to the first embodiment. The generation process shown in FIG. 11 is executed, for example, at a timing of turning on the imaging function of the portable terminal 2.

As shown in FIG. 11, the acquiring unit 11 of the image processing device 1 acquires an input frame image as a first frame image, as an acquisition process (S10: an acquisition step) first. For example, the acquiring unit 11 inputs the first frame image from the imaging device 21. Then, a motion relative to a second frame image, which is one frame image among several frames before and after the first frame image, is calculated by the motion data calculating unit 12 of the image processing device 1.

Next, the cropping unit 13 of the image processing device 1 sets the cropping region $K^i$ as a setting process (S12). The cropping unit 13 sets the cropping region on the canvas (the coordinate space) where the first frame image and a composite image are depicted, in a manner of canceling a motion of the imaging device 21 (see FIG. 5).

The image generating unit 14 of the image processing device 1 determines whether the cropping region $K^i$ is in the first frame image or not, as a determination process (S14). When it is determined that the cropping region $K^i$ is in the first frame image (S14: Yes), the cropping unit 13 crops an image in the cropping region $K^i$ as an output frame image, as a cropping process (S16: a cropping step). Thereby, an output frame image is generated, and the generation process shown in FIG. 11 ends.

On the other hand, when it is determined that the cropping region $K^i$ is not in the first frame image (S14: No), the image generating unit 14 stitches the first frame image and the second frame image to generate a composite image, as a generation process (S18: an image generation step). Otherwise, when it is not possible to generate a composite image (in the case of the classification (D) in FIG. 9), the image generating unit 14 outputs a signal showing the effect to the cropping unit 13.

When the composite image is generated by the generation process (S18), the cropping unit 13 determines whether the cropping region $K^i$ is in the composite image or not, as the cropping process (S16). When it is determined that the cropping region $K^i$ is in the composite image, the cropping unit 13 crops an image in the cropping region $K^i$ as an output frame image. When it is determined that the cropping region $K^i$ is not in the composite image, the cropping unit 13 causes the cropping region $K^i$ to move into the composite image, and, after that, crops an image in the cropping region $K^i$ as an output frame image. Further, when a composite image is not generated by the generation process (S18), the cropping unit 13 causes the cropping region $K^i$ to move into the first frame image, and, after that, crops an image in the cropping region $K^i$ as an output frame image, as the cropping process (S16). Thus, an output frame image is generated, and the generation process shown in FIG. 11 ends.

Thus, the generation process shown in FIG. 11 ends. By the generation process shown in FIG. 11 being executed, it is possible to, even if the cropping region $K^i$ protrudes from a first frame image, generate an output frame image without resetting the cropping region $K^i$, by stitching two frame images. Further, even in the case of resetting the cropping region it is possible to reduce an amount of movement of the cropping region $K^i$ by stitching two frame images. Thereby, it is possible to suppress unsteadiness due to image stabilization. Furthermore, stitching two frame images makes it possible to adopt a stronger correction parameter in comparison with the case of one frame image.

Next, an image processing program for causing the portable terminal (computer) 2 to function as the image processing device 1 described above will be described.

The image processing program is provided with a main module, an input module and an operation processing module. The main module is a part that comprehensively controls image processing. The input module causes the portable terminal 2 to operate to acquire a frame image. The operation processing module is provided with a motion data calculating module, a cropping module and an image generating module. Functions realized by causing the main module, the input module and the operation processing module to be executed are similar to the functions of the acquiring unit 11, the motion data calculating unit 12, the cropping unit 13 and the image generating unit 14 of the image processing device 1 described above, respectively.

The image processing program is stored, for example, in a recording medium such as a ROM or a semiconductor memory. Further, the image processing program may be provided via a network.

Summary of First Embodiment

As described above, according to the image processing device 1, the image processing method and the image processing program according to the present embodiment, a composite image is generated by stitching a first frame image and a second frame image. Therefore, the image processing device 1 can suppress the operation cost for generating a composite image in comparison with the case of supplementing image information about a region other than a frame region using a plurality of frame images. Then, the cropping region $K^i$ is set in the composite image larger than the first frame image and the second frame image. Thereby, the necessity of restricting a region where the cropping region $K^i$ can be set to be within the first frame region is eliminated, and, therefore, the opportunity of being able to sufficiently exhibit the image stabilization function increases. Thus, the image processing device 1 can exhibit the image stabilization function while suppressing the operation cost.

Further, since the image processing device 1 does not generate a composite image when it is not necessary to expand the region where the cropping region $K^i$ can be set, the image processing device 1 can further reduce the operation cost. Further, since the image processing device 1 sets the seam 200 in a manner of avoiding a part with a large brightness value difference, the image processing device 1 can realize a natural result.

Second Embodiment

In comparison with the image processing device 1 according to the first embodiment, an image processing device 1A according to a second embodiment is different in an input source of the acquiring unit 11 and an operation of a cropping unit 13A, and is the same in other points. In description of the image processing device 1A, description overlapping with description of the image processing device 1 will be omitted.

Device Configuration

Figure 12:
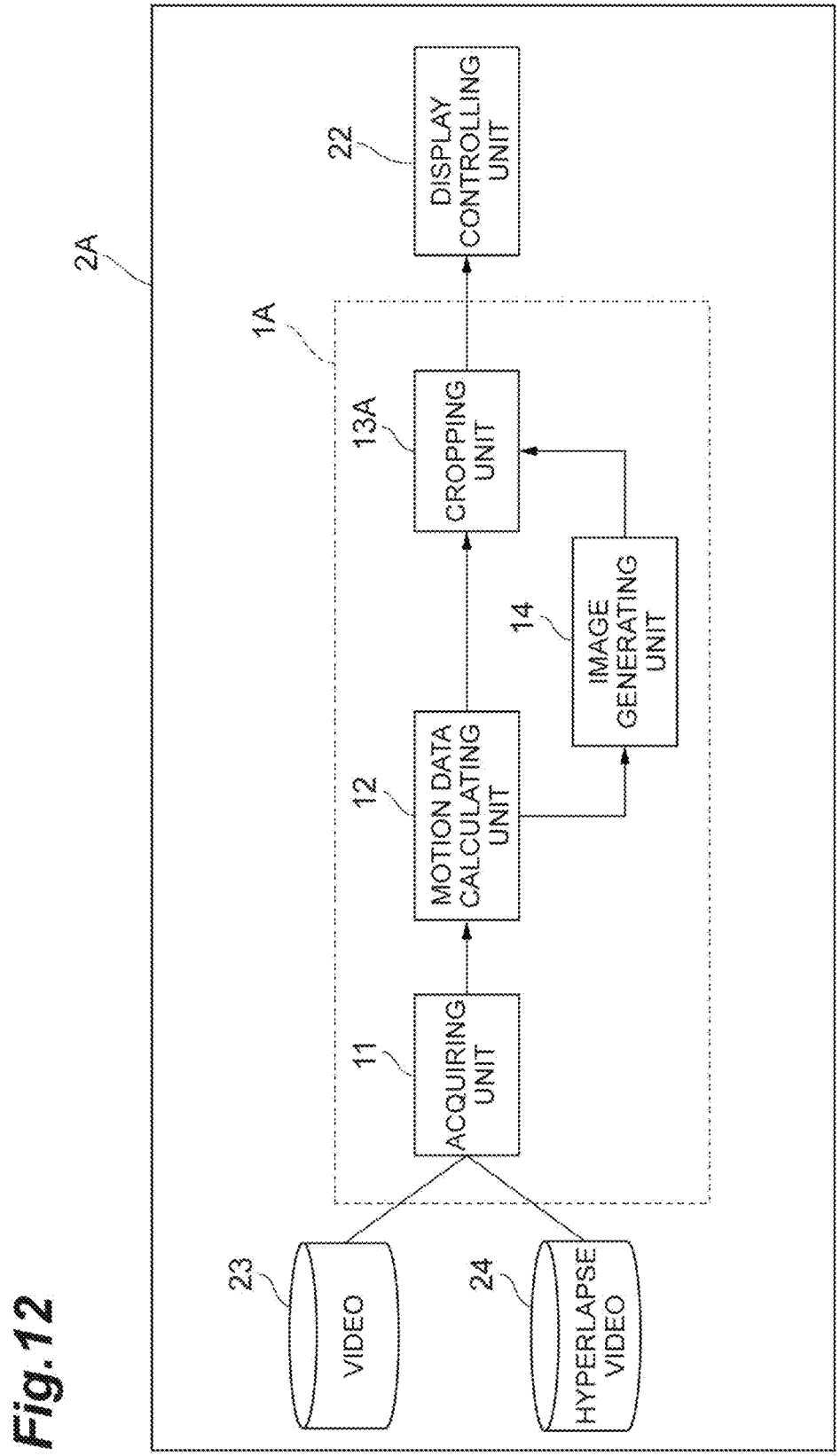
FIG. 12 is a functional block diagram of a portable terminal of an image processing device according to a second embodiment.

FIG. 12 is a functional block diagram of a portable terminal 2A of the image processing device 1A according to the second embodiment. As shown in FIG. 12, in comparison with the image processing device 1, the configuration of the image processing device 1A is such that the imaging device 21 is not provided, but video 23 and hyperlapse video 24 are provided. Components other than the cropping unit 13A are the same.

The video 23 is data that includes frame images consecutive in time series. The hyperlapse video 24 is data that includes frame images consecutive in time series, and is, specifically, aggregate data of still images shot at regular intervals. The acquiring unit 11 acquires at least one of the video 23 and the hyperlapse video 24. That is, the second embodiment is not a case of real-time processing but a case where stored data exists.

In comparison with the cropping unit 13, the cropping unit 13A is different in the cropping region $K^i$ setting process. The cropping unit 13A regards components other than camera works among motion data as handshakes and cancels the components.

The cropping unit 13A defines a cost of a camera work and adopts a camera work the cost of which becomes the lowest, as a final camera work. An ideal camerawork is thought to be an operation of bringing a cropping window to the center of an image, basically, an operation of maintaining a constant velocity linear motion. Therefore, the cost is defined as expressed by the following expression (2) so that the cost becomes low in the case of being close to the ideal camera work. Translation components are ignored, and only rotation components of yaw, pitch and roll are considered.

[Expression 2]

$$\text{cost} = \varepsilon_t \cdot N_t + \sum_{i \in all\_frames} (\varepsilon_\alpha \text{abs}(A_i) + \varepsilon_\beta \text{abs}(B_i) + \varepsilon_\gamma \text{abs}(C_i)) + \varepsilon_P \cdot N_P \quad (2)$$

Here, the first term on the right side is a product of the number of times $N_t$ of direction changing and a coefficient $\varepsilon_t$. That is, in the case of such a camera work of continuing a constant velocity linear motion as far as possible performing direction changing when it is inevitable, the cost is low. The second term on the right side is a sum total of amounts of deviations (amounts of deviations in a yaw direction, a pitch direction and a roll direction) of the cropping region $K^i$ from the center of an image calculated for each frame image. That is, in the case of such a camera work that a cropping frame is brought to the center of an image, the cost is low. The third term on the right side is a product of the number of times $N_P$ of causing the cropping region $K^i$ to move into a composite image or a first frame image (the number of times of pressing in) and the coefficient $\varepsilon_t$. A smaller number of times of pressing in can be said to be ideal because image stabilization is stable.

Expression (2) cannot be calculated because the number of assumed patterns is infinite. Therefore, the cropping unit 13A performs search for an ideal camera work using a tree structure shown in FIGS. 13 to 16. Specifically, the cropping unit 13A performs the camera work search, restricting a search range of the tree structure. FIGS. 13 to 16 are diagrams illustrating the camera work search.

Figure 13:
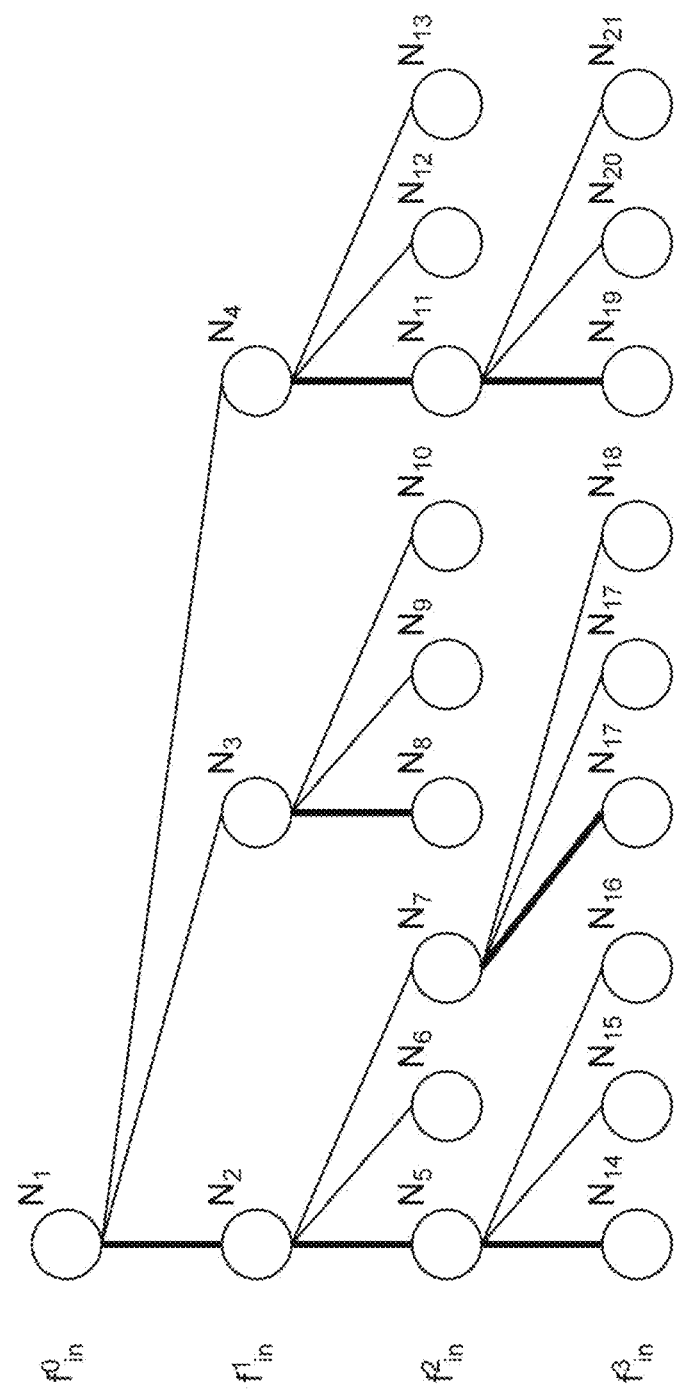
FIG. 13 is a diagram illustrating camera work search.

In the tree structure shown in FIG. 13, frame images are hierarchized. Circular nodes are displayed on each hierarchical layer. A node corresponds to a cropping process for each frame. A cost defined by expression (2) is associated with each node. In a case where a camera work continues a constant velocity linear motion from a current frame image (a current node) to the next frame image (a lower hierarchical layer), an edge indicated by a thick line in FIG. 13 extends from the node. On the other hand, in a case where a camera work turns a direction when transitioning from a current frame image (a current node) to the next frame image (a lower hierarchical layer), an edge indicated by a thin line in FIG. 13 extends from the node. That is, a route (path) from a root to a leaf corresponds to a specific camera work. In FIG. 13, by restricting the number of patterns of direction turning to a finite number (two in FIG. 13) for each node, the operation cost is reduced.

Figure 14:
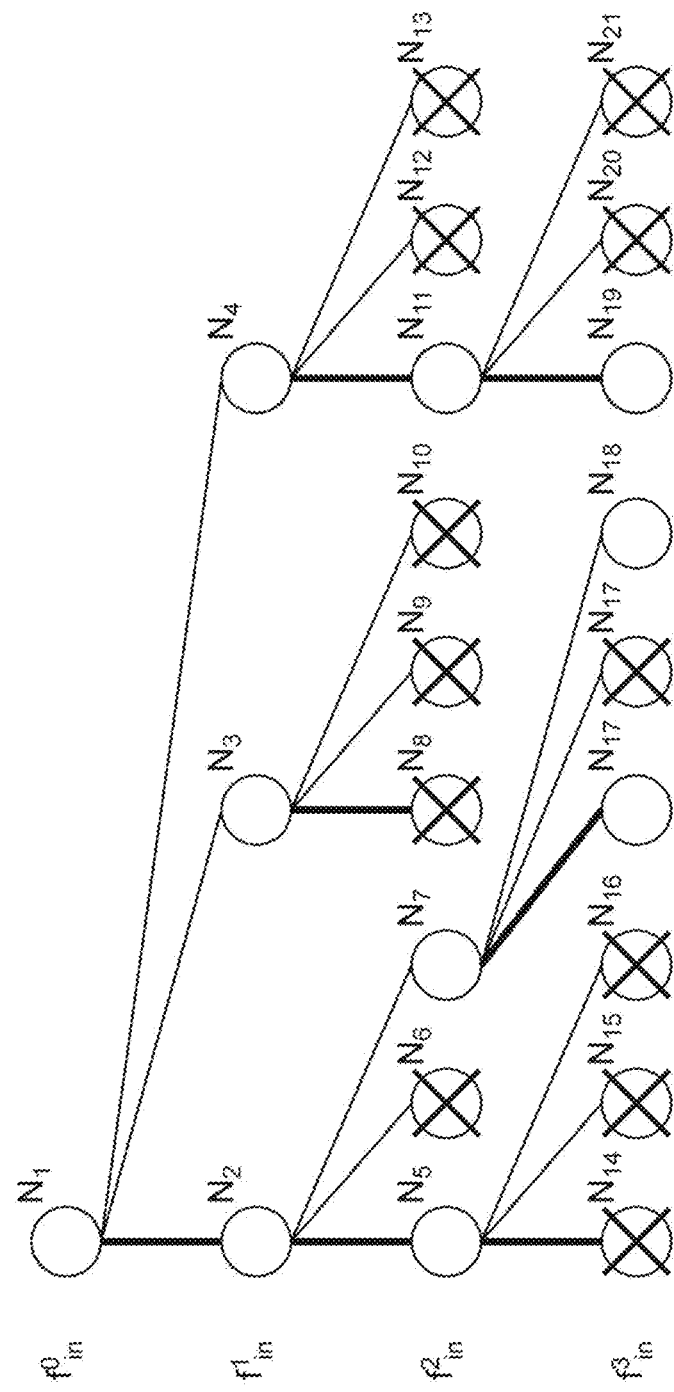
FIG. 14 is a diagram illustrating the camera work search.

The cropping unit 13A sets an upper limit value of the number of nodes for each frame image to further reduce the operation cost. Thereby, a node is selected in ascending order of the cost up to the upper limit value. In FIG. 14, the upper limit value of the number of nodes is set to "three". That is, in a frame image $f^2_{in}$, nodes $N_5$, $N_7$ and $N_{11}$ the costs of which are low are adopted, and remaining nodes $N_6$, $N_8$ to $N_{10}$, $N_{12}$ and $N_{13}$ are not adopted. Similarly, in a frame image $f^3_{in}$, nodes $N_{17}$, $N_{18}$ and $N_{19}$ the costs of which are low are adopted, and remaining nodes $N_{14}$ to $N_{16}$, $N_{17}$, $N_{20}$ and $N_{21}$ are not adopted.

Figure 15:
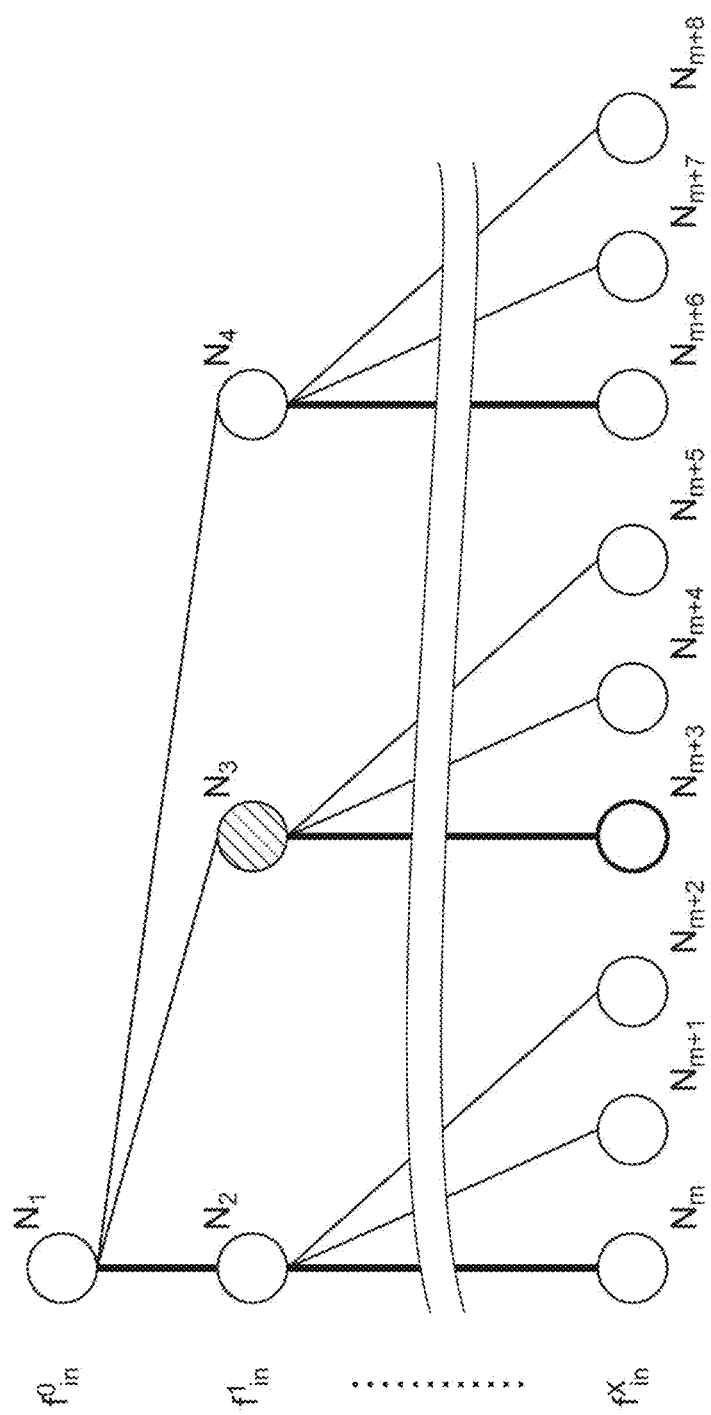
FIG. 15 is a diagram illustrating the camera work search.
Figure 16:
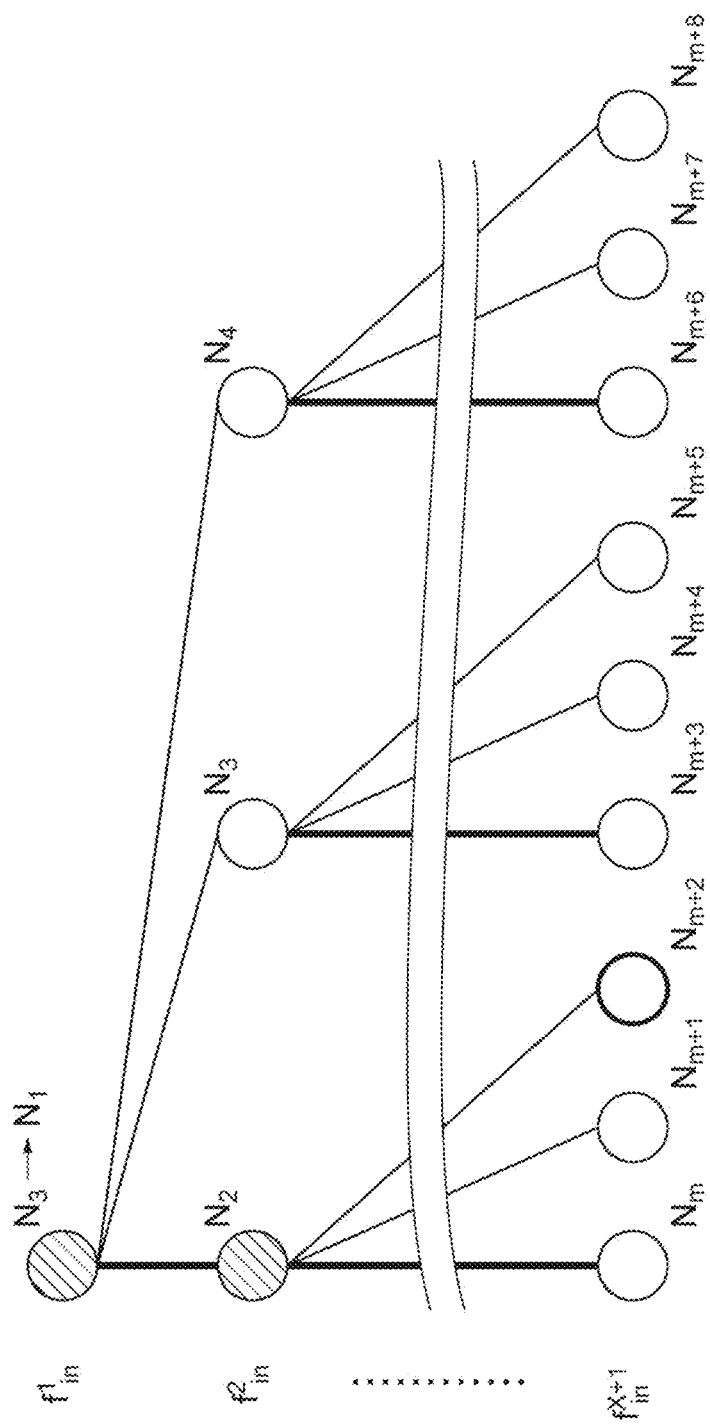
FIG. 16 is a diagram illustrating the camera work search.

Even when the upper limit value is set, it may be necessary to perform operation for all the frame images in order to obtain the first result. Therefore, the cropping unit 13A forcingly fixes a result of a frame image $f^1_{in}$ at a time point of a frame image $f^X_{in}$. In FIG. 15, it is assumed that the minimum cost at the time point of the frame image $f^X_{in}$ is a node $N_{m+3}$. In this case, the result of the frame image fixed to a node $N_3$, which is an ancestor of the node $N_{m+3}$. Then, as shown in FIG. 16, the node $N_3$ of the frame image $f^1_{in}$ is set as a new root to configure a subtree. This process is repeated for the frame image $f^2_{in}$, the frame image $f^3_{in}$, . . . . Thereby, though it is necessary to process information corresponding to X frame images as an initial process at the time of starting processing, it becomes possible for the cropping unit 13A to perform frame-by-frame processing by estimating a camera work as described above, and estimate a camera work close to the minimum in realistic processing time.

Summary of Second Embodiment

As described above, according to the image processing device 1A, the image processing method and the image processing program according to the present embodiment, in the case of using the video 23 or the hyperlapse video 24 also, the same effects as the image processing device 1 are obtained. Further, in this device, in a case where performing search using a tree structure, calculation in which the number of child nodes belonging to each parent node, the number of nodes existing at the same depth and the like are restricted is performed. Thereby, this device can reduce the operation cost.

Third Embodiment

In comparison with the image processing device 1 according to the first embodiment, an image processing device 1B according to a third embodiment is different in being provided with a magnification acquiring unit 15 and a timing of composite image generation of an image generating unit 14B, and is the same in other points. In description of the image processing device 1B, description overlapping with description of the image processing device 1 will be omitted.

Device Configuration

Figure 17:
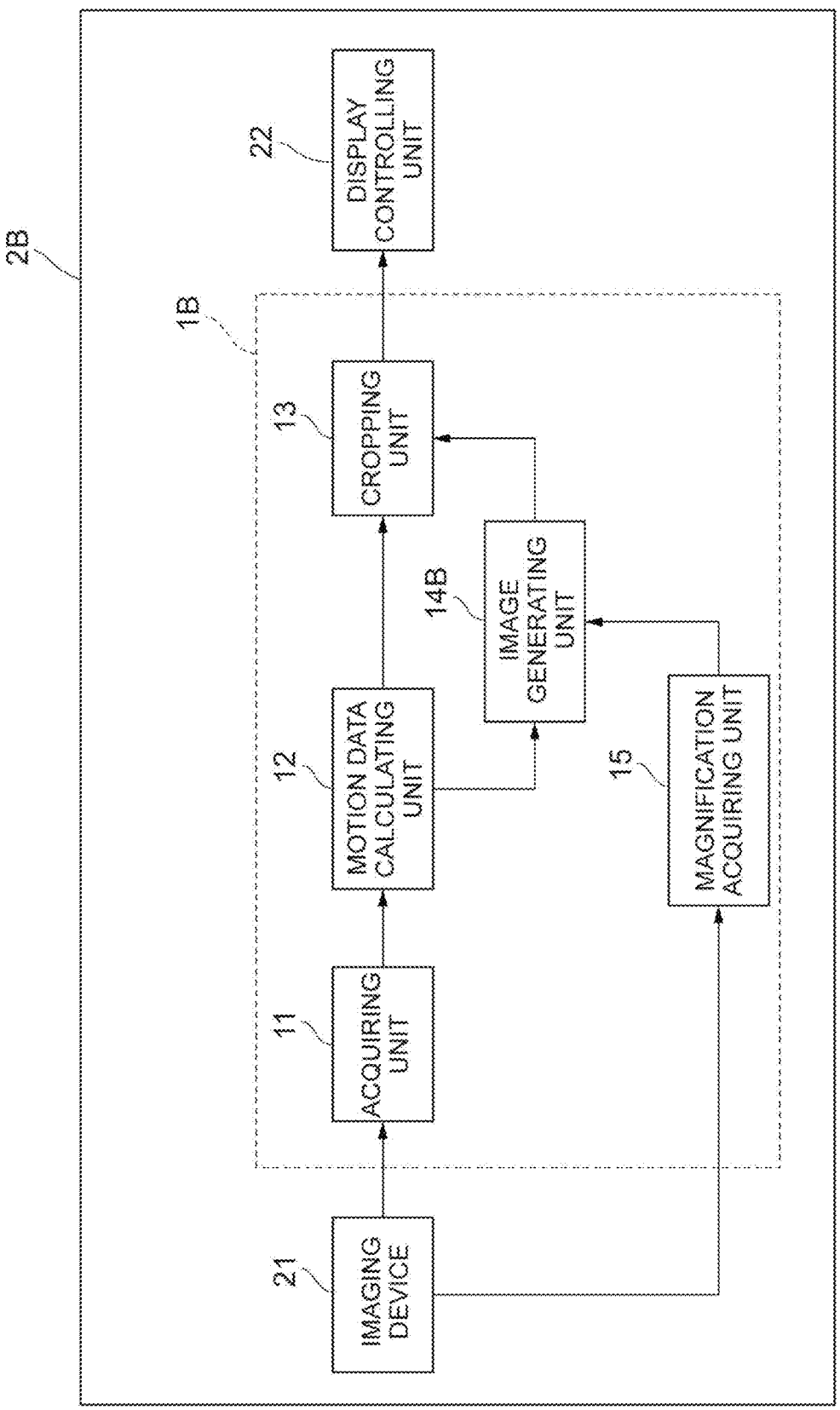
FIG. 17 is a functional block diagram of a portable terminal of an image processing device according to a third embodiment.

FIG. 17 is a functional block diagram of a portable terminal 2B of the image processing device 1B according to the third embodiment. As shown in FIG. 17, in comparison with the image processing device 1, the configuration of the image processing device 1B is different in being provided with the magnification acquiring unit 15. Components other than the image generating unit 4B are the same.

The magnification acquiring unit 15 acquires at least one of a zoom-in magnification, a zoom-out magnification and an object display magnification of a first frame image relative to a second frame image. The magnification acquiring unit 15 is realized by the CPU 100 executing a program in the main memory or the auxiliary storage device 105 and controlling the input device 103 according to the program. The magnification acquiring unit 15 acquires information about the magnifications described above, for example, from the imaging device 21. The magnification acquiring unit 15 may calculate the information about the magnification by comparing a first frame image and a second frame image.

The image generating unit 14B does not generate a composite image when an amount of change per unit time of a magnification acquired by the magnification acquiring unit 15 is equal to or above a threshold. This is because, when the amount of change per unit time of the magnification acquired by the magnification acquiring unit 15 is equal to or above the threshold, the possibility of being the classification (D) in FIG. 9 is strong. The threshold is a value set in advance to determine the amount of change.

Output Frame Image Generation Process

Figure 18:
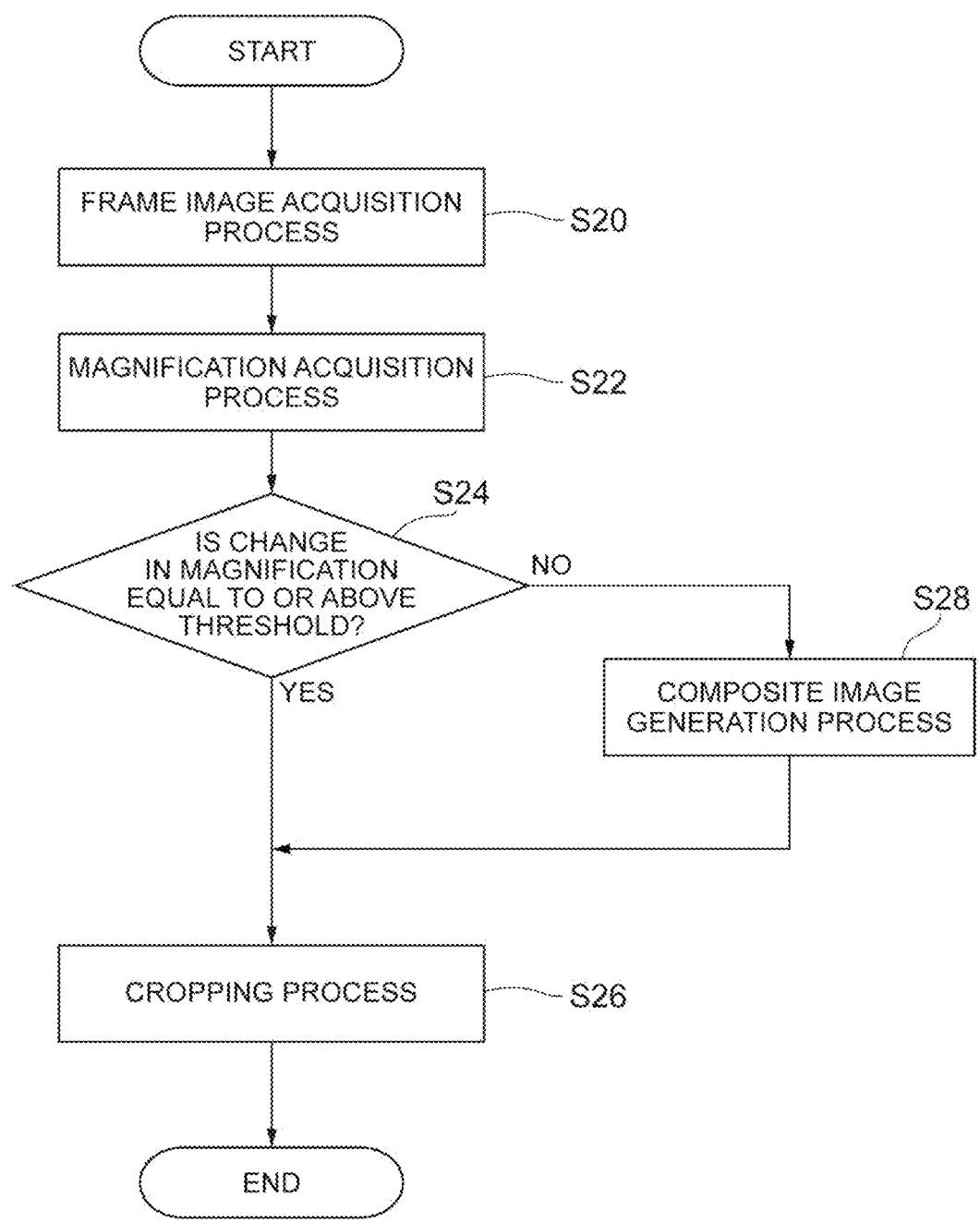
FIG. 18 is a flowchart of an output frame image generation process of the image processing device according to the third embodiment.

FIG. 18 is a flowchart of an output frame image generation process of the image processing device 1B according to the third embodiment. The generation process shown in FIG. 18 is executed, for example, at the timing of turning on the imaging function of the portable terminal 2B.

As shown in FIG. 18, the acquiring unit 11 of the image processing device 1B acquires an input frame image as a first frame image, as an acquisition process (S20) first. This process is the same as the acquisition process (S10) in FIG. 11.

Next, the magnification acquiring unit 15 of the image processing device 1B acquires at least one of the zoom-in magnification, the zoom-out magnification and the object display magnification of the first frame image relative to a second frame image from the imaging device 21, as a magnification acquisition process (S22).

The image generating unit 14B of the image processing device 1B determines whether or not change in the magnification is equal to or above a threshold, as a determination process (S24). When it is determined that the change in the magnification is equal to or above the threshold (S24: Yes), the cropping unit 13 determines whether the cropping region $K^i$ is in the first frame image or not, as a cropping process (S26). When it is determined that the cropping region $K^i$ is in the first frame image, the cropping unit 13 crops an image in the cropping region $K^i$ as an output frame image. When it is determined that the cropping region $K^i$ is not in the first frame image, the cropping unit 13 causes the cropping region $K^i$ to move into the first frame image, and, after that, crops an image in the cropping region as an output frame image. Thereby, an output frame image is generated, and the generation process shown in FIG. 18 ends.

On the other hand, when it is determined that the change in the magnification is not equal to or above the threshold (S24: No), the image generating unit 14B stitches the first frame image and the second frame image to generate a composite image, as a generation process (S28).

When the composite image is generated by the generation process (S28), the cropping unit 13 determines whether the cropping region $K^i$ is in the composite image or not, as a cropping process (S16). When it is determined that the cropping region $K^i$ is in the composite image, the cropping unit 13 crops an image in the cropping region $K^i$ as an output frame image. When it is determined that the cropping region $K^i$ is not in the composite image, the cropping unit 13 causes the cropping region $K^i$ to move into the composite image, and, after that, crops an image in the cropping region $K^i$ as an output frame image. Thus, an output frame image is generated, and the generation process shown in FIG. 18 ends.

Summary of Third Embodiment

As described above, according to the image processing device 1B, the image processing method and the image processing program according to the present embodiment, it is possible to, by not generating a composite image when it is expected that operation cost of a composite image is large, avoid response deterioration.

Fourth Embodiment

In comparison with the image processing device 1 according to the first embodiment, an image processing device 1C according to a fourth embodiment is different in being provided with a recognizing unit 16 and a timing of composite image generation of an image generating unit 14C, and is the same in other points. In description of the image processing device 1C, description overlapping with description of the image processing device 1 will be omitted.

Device Configuration

Figure 19:
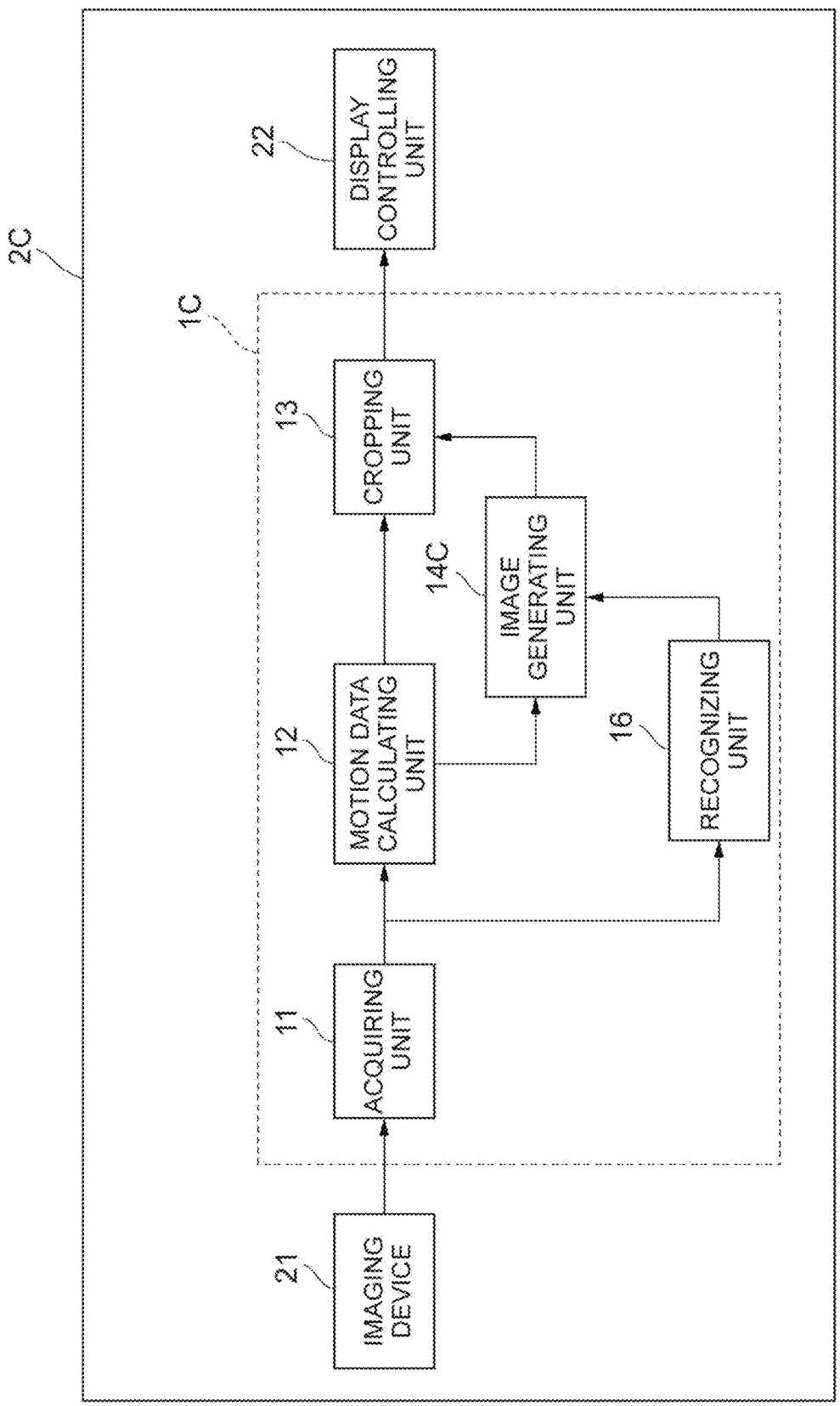
FIG. 19 is a functional block diagram of a portable terminal of an image processing device according to a fourth embodiment.

FIG. 19 is a functional block diagram of a portable terminal 2C of the image processing device 1C according to the fourth embodiment. As shown in FIG. 19, in comparison with the image processing device 1, the configuration of the image processing device 1C is different in being provided with the recognizing unit 16. Components other than the image generating unit 14C are the same.

The recognizing unit 16 recognizes the size of an object of a first frame image or a second frame image. The recognizing unit 16 is realized by the CPU 100 executing a program in the main memory or the auxiliary storage device 105. The recognizing unit 16 recognizes the size of an object using a well-known image processing technique. The object refers to an imaging target.

When the size of an object acquired by the recognizing unit 16 is equal to or above a threshold, the image generating unit 14C does not generate a composite image. This is because, when the size of the object is equal to or above the threshold, there is a possibility that image quality after combination deteriorates. The threshold is a value set in advance to determine the size of an object.

Output Frame Image Generation Process

Figure 20:
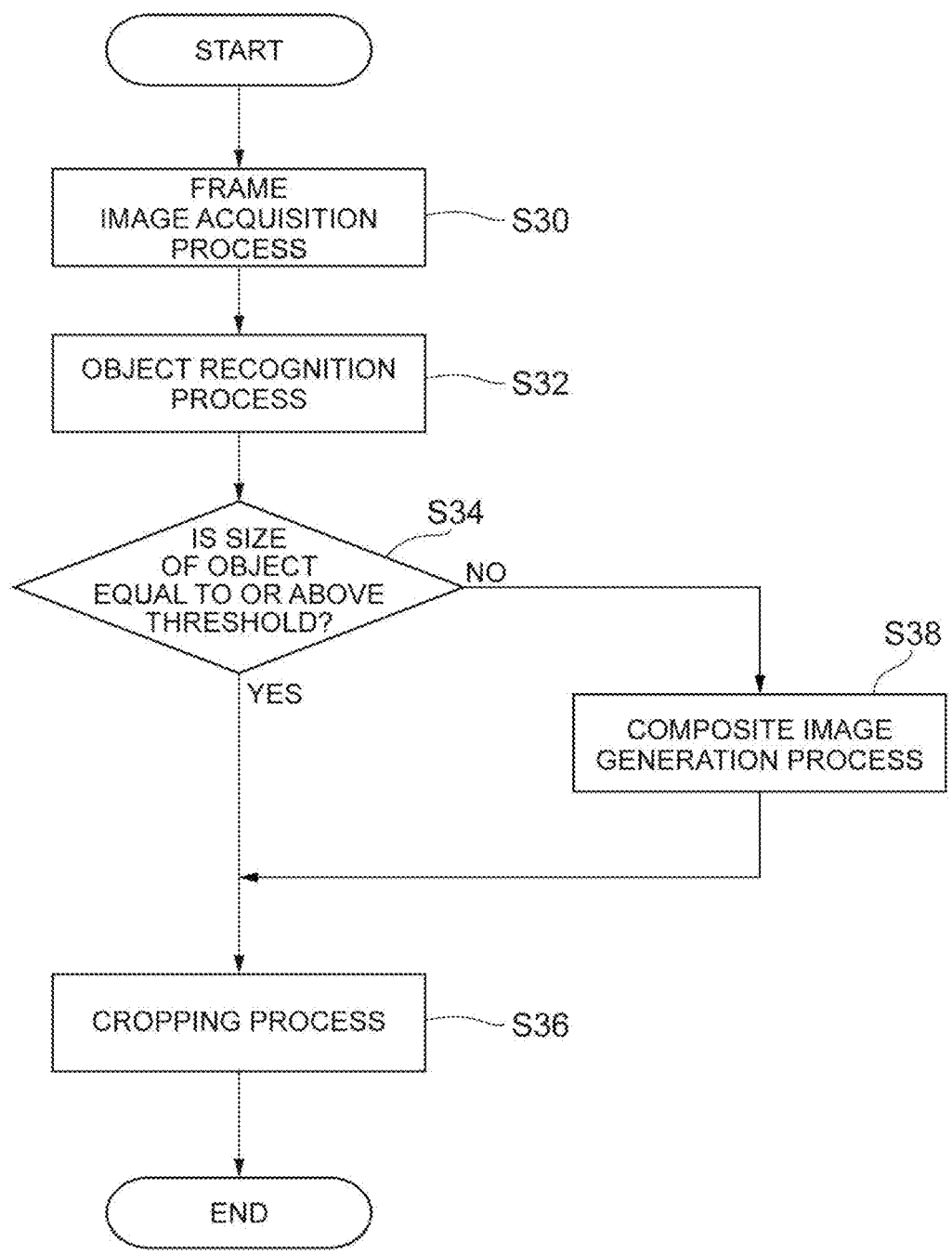
FIG. 20 is a flowchart of an output frame image generation process of the image processing device according to the fourth embodiment.

FIG. 20 is a flowchart of an output frame image generation process of the image processing device 1C according to the fourth embodiment. The generation process shown in FIG. 20 is executed, for example, at the timing of turning on the imaging function of the portable terminal 2C.

As shown in FIG. 20, the acquiring unit 11 of the image processing device 1C acquires an input frame image as a first frame image, as an acquisition process (S30) first. This process is the same as the acquisition process (S10) in FIG. 11.

Next, the recognizing unit 16 of the image processing device 1C recognizes, for example, the size of an object of the first frame image, as a recognition process (S32).

The image generating unit 14C of the image processing device 1C determines whether or not the size of the object is equal to or above a threshold, as a determination process (S34). When it is determined that the size of the object is equal to or above the threshold (S34: Yes), the cropping unit 13 determines whether the cropping region $K^i$ is in the first frame image or not, as a cropping process (S36). When it is determined that the cropping region $K^i$ is in the first frame image, the cropping unit 13 crops an image in the cropping region as an output frame image. When it is determined that the cropping region $K^i$ is not in the first frame image, the cropping unit 13 causes the cropping region $K^i$ to move into the first frame image, and, after that, crops an image in the cropping region $K^i$ as an output frame image. Thereby, an output frame image is generated, and the generation process shown in FIG. 20 ends.

On the other hand, when it is determined that the size of the object is not equal to or above the threshold (S34: No), the image generating unit 14C stitches the first frame image and a second frame image to generate a composite image, as a generation process (S38).

When the composite image is generated by the generation process (S38), the cropping unit 13 determines whether the cropping region $K^i$ is in the composite image or not, as a cropping process (S36). When it is determined that the cropping region $K^i$ is in the composite image, the cropping unit 13 crops an image in the cropping region $K^i$ as an output frame image. When it is determined that the cropping region $K^i$ is not in the composite image, the cropping unit 13 causes the cropping region $K^i$ to move into the composite image, and, after that, crops an image in the cropping region $K^i$ as an output frame image. Thus, an output frame image is generated, and the generation process shown in FIG. 20 ends.

Summary of Fourth Embodiment

As described above, according to the image processing device 1C, the image processing method and the image processing program according to the present embodiment, it is possible to, by not generating a composite image when it is expected that the composite image becomes an unnatural image, avoid deterioration in image quality.

The embodiments of the present disclosure have been described above. The technical scope of the present disclosure should not be limitatively interpreted by the description of the present embodiments. The present embodiments are mere examples, and it is understood by those skilled in the art that various modification of the embodiments are possible on the basis of descriptions in CLAIMS. The technical scope of the present disclosure should be defined on the basis of the descriptions in CLAIMS and a scope equal to the descriptions.

For example, the image processing device 1 may be such that the input source of the acquiring unit 11 is the video 23 or the hyperlapse video. That is, the image processing device 1 is not limited to real-time processing. Further, it is sufficient when the image processing device 1A can refer to the video 23 or the hyperlapse video 24, and the image processing device 1A may not be provided with a storage unit itself for storing the video 23 and the hyperlapse video 24. Furthermore, the image processing devices 1 and 1A may transmit video to a server with a high processing capacity after shooting and storing the video and cause the server to perform the image stabilization process.

For example, though the image processing devices 1 and 1A do not generate a composite image when it is not necessary to expand the region where the cropping region $K^i$ can be set, the process may be changed to always generate a composite image.

For example, the image processing devices 1 and 1A may not cause a frame image with a time difference larger than a certain predetermined time threshold to be a composition target, taking into account that, when frame images with a large time difference are stitched, the possibility of failure is strong. Further, the image processing devices 1 and 1A may cause the time threshold to change, using how many moving objects are in a frame image to be a shooting target as an indicator. As a specific example, the image processing devices 1 and 1A may cause the time threshold to be small when the number of moving objects is large.

Further, the image processing devices 1 and 1A may be configured in a manner of buffering a processing result and outputting the processing result a little late for reproduction of recorded video or hyperlapse video. Further, the image processing devices 1 and 1A may change a seam search range or the number of frames to be stitched (for example, three or more) for each frame image, with float or an estimated value of the float at a time point of frame image operation processing as a parameter. The float may be set larger as the amount of the buffered processing result is larger.

Further, though an example in which the cropping unit 13A performs cropping from a composite image at the time of performing search using a tree structure was explained, a cropping target may not be a composite image.

Furthermore, the image processing devices described in the embodiments may perform processing as follows. The image processing devices may calculate only an outer frame of a composite image without generating the composite image itself. Further, when an outer frame is a polygon, the image processing devices may calculate only information about vertexes. Then, the image processing devices may decide a cropping window using information about the outer frame (or the information about the vertexes). Then, the image processing devices may perform seam search and composition simultaneously with cropping. Thereby, in comparison with the case of performing combination to obtain the whole image, operation cost is reduced because only a necessary part is processed.

REFERENCE SIGNS LIST 1, 1A, 1B, 1C . . . image processing device; 21 . . . imaging device; 11 . . . acquiring unit; 12 . . . motion data calculating unit; 13, 13A . . . cropping unit; 14, 14B, 14C . . . image generating unit; 15 . . . magnification acquiring unit; 16 . . . recognizing unit; 23 . . . video; 24 . . . hyperlapse video

The invention claimed is:

1. An image processing device performing image stabilization of frame images shot by an imaging device, the image processing device comprising:
   a processor; and
   a memory storing executable instructions, that when executed by the processor, causes the processor to perform as:
   an acquiring unit configured to acquire a plurality of frame images;
   an image generating unit configured to generate a composite image by stitching a first frame image and a second frame image among the plurality of frame images acquired by the acquiring unit, the second frame image being one frame image among several frames before and after the first frame image, the composite image being larger than a size of the first frame image and the second frame image; and
   a cropping unit configured to set a cropping region to the composite image and configured to output an image in the cropping region as an output frame image,
   wherein the image generating unit limits a search range of a position of a seam between the first frame image and the second frame image based on classifications of a deficit region, and the deficit region is a region included in the cropping region and not included in the first frame image.

2. The image processing device according to claim 1, wherein
   the cropping unit sets the cropping region to the first frame image; and
   the image generating unit generates the composite image when it is not possible to set the cropping region in the first frame image by the cropping unit, and does not generate the composite image when it is possible to set the cropping region in the first frame image by the cropping unit.

3. The image processing device according to claim 1, wherein the image generating unit selects the second frame image to be stitched with the first frame image, from a frame group consisting of the several frames before and after the first frame image.

4. The image processing device according to claim 1, wherein the acquiring unit acquires the frame images from video.

5. The image processing device according to claim 1, wherein the acquiring unit acquires the frame images from hyperlapse video.

6. The image processing device according to claim 1, wherein the acquiring unit acquires the frame images from the imaging device.

7. The image processing device according to claim 1, wherein the cropping unit sets a position of the cropping region according to a motion of the imaging device.

8. The image processing device according to claim 1, wherein the processor further performs as a magnification acquiring unit configured to acquire at least one of a zoom-in magnification, a zoom-out magnification and an object display magnification of the first frame image relative to the second frame image; and wherein
   the image generating unit does not generate the composite image when an amount of change per unit time of the magnification acquired by the magnification acquiring unit is equal to or above a threshold.

9. The image processing device according to claim 1, wherein the processor further performs as a recognizing unit configured to recognize a size of an object of the first frame image or the second frame image; and wherein
   the image generating unit does not generate the composite image when the size of the object recognized by the recognizing unit is equal to or above a threshold.

10. An image processing method for performing image stabilization of frame images shot by an imaging device, the image processing method comprising:
    acquiring the plurality of frame images;
    generating a composite image by stitching a first frame image and a second frame image among the plurality of frame images acquired by the acquiring, the second frame image being one frame image among several frames before and after the first frame image, the composite image being larger than a size of the first frame image and the second frame image; and
    setting a cropping region to the composite image and outputting an image in the cropping region as an output frame image,
    wherein the generating limits a search range of a position of a seam between the first frame image and the second frame image based on classifications of a deficit region, and the deficit region is a region included in the cropping region and not included in the first frame image.

11. A non-transitory storage medium storing an image processing program for performing image stabilization of frame images shot by an imaging device, the image processing program causing a computer to function as:
    an acquiring unit configured to acquire the plurality of frame images;
    an image generating unit configured to generate a composite image by stitching a first frame image and a second frame image among the plurality of frame images acquired by the acquiring unit, the second frame image being one frame image among several frames before and after the first frame image, the composite image being larger than a size of the first frame image and the second frame image; and
    a cropping unit configured to set a cropping region to the composite image and configured to output an image in the cropping region as an output frame image,
    wherein the image generating unit limits a search range of a position of a seam between the first frame image and the second frame image based on classifications of a deficit region, and the deficit region is a region included in the cropping region and not included in the first frame image.

12. The image processing device according to claim 2, wherein the processor further performs as a magnification acquiring unit configured to acquire at least one of a zoom-in magnification, a zoom-out magnification and an object display magnification of the first frame image relative to the second frame image; and wherein
    the image generating unit does not generate the composite image when an amount of change per unit time of the magnification acquired by the magnification acquiring unit is equal to or above a threshold.

13. The image processing device according to claim 3, wherein the processor further performs as a magnification acquiring unit configured to acquire at least one of a zoom-in magnification, a zoom-out magnification and an object display magnification of the first frame image relative to the second frame image; and wherein the image generating unit does not generate the composite image when an amount of change per unit time of the magnification acquired by the magnification acquiring unit is equal to or above a threshold.

14. The image processing device according to claim 2, wherein the processor further performs as a recognizing unit configured to recognize a size of an object of the first frame image or the second frame image; and wherein the image generating unit does not generate the composite image when the size of the object recognized by the recognizing unit is equal to or above a threshold.

15. The image processing device according to claim 3, wherein the processor further performs as a recognizing unit configured to recognize a size of an object of the first frame image or the second frame image; and wherein the image generating unit does not generate the composite image when the size of the object recognized by the recognizing unit is equal to or above a threshold.

\* \* \* \* \*